US011884093B2

(12) United States Patent
Fukuda et al.

(10) Patent No.: US 11,884,093 B2
(45) Date of Patent: Jan. 30, 2024

(54) MECHANICAL PENCIL

(71) Applicant: MITSUBISHI PENCIL COMPANY, LIMITED, Tokyo (JP)

(72) Inventors: Takamasa Fukuda, Tokyo (JP); Yusuke Koizumi, Tokyo (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 162 days.

(21) Appl. No.: 17/603,426

(22) PCT Filed: Feb. 20, 2020

(86) PCT No.: PCT/JP2020/006910
§ 371 (c)(1),
(2) Date: Oct. 13, 2021

(87) PCT Pub. No.: WO2020/217682
PCT Pub. Date: Oct. 29, 2020

(65) Prior Publication Data

US 2022/0184995 A1 Jun. 16, 2022

(30) Foreign Application Priority Data

Apr. 26, 2019 (JP) ................................ 2019-086686

(51) Int. Cl.
*B43K 21/22* (2006.01)
*B43K 21/18* (2006.01)

(52) U.S. Cl.
CPC .............. *B43K 21/22* (2013.01); *B43K 21/18* (2013.01)

(58) Field of Classification Search
CPC ....... B43K 21/18; B43K 21/22; B43K 21/033
See application file for complete search history.

(56) References Cited

U.S. PATENT DOCUMENTS 4,003,664 A 1/1977 Butka
2010/0322695 A1 12/2010 Ohsawa et al.
2022/0140008 A1 * 5/2022 Fukagawa ............ H10K 59/123 257/98

FOREIGN PATENT DOCUMENTS

JP 59-110679 U 7/1984
JP 8-072473 A 3/1996
(Continued)

OTHER PUBLICATIONS

International Search Report dated May 12, 2020, issued in counterpart application No. PCT/JP2020/006910 (3 pages).
(Continued)

*Primary Examiner* — J C Jacyna
(74) *Attorney, Agent, or Firm* — WHDA, LLP

(57) ABSTRACT

A mechanical pencil includes a ball chuck, a rotation drive mechanism having a rotary part and receiving an axial direction retraction operation due to writing pressure received by the lead held by the ball chuck and an axial direction advance operation due to release of the writing pressure to drive the rotary part to rotate in one direction, a feed cam face having a ring-shaped cam face vertical to the axial direction and an axial direction step part, and a slider having an abutting part abutting against the feed cam face and a holding chuck holding a lead and rotating upon receiving a rotation drive force of the rotary part, which is configured so that the lead held by the holding chuck is pulled out from the ball chuck due to the advance operation of the slider.

13 Claims, 20 Drawing Sheets

(56) References Cited

FOREIGN PATENT DOCUMENTS

| | | | |
|---|---|---|---|
| JP | 8-132782 | A | 5/1996 |
| JP | 2009-233921 | A | 10/2009 |
| JP | 2013-001020 | A | 1/2013 |
| JP | 2013-215926 | A | 10/2013 |
| JP | 2016-153246 | A | 8/2016 |
| KR | 10-2014-0045428 | A | 4/2014 |
| WO | 2012/014832 | A1 | 2/2012 |
| WO | 2012/176636 | A1 | 12/2012 |

OTHER PUBLICATIONS

Office Action dated Oct. 24, 2022, issued in counterpart KR Application No. 10-2021-7019180, with English Translation. (9 pages).

Extended European Search Report dated Dec. 7, 2022, issued in counterpart EP Application No. 20795528.7. (8 pages).

* cited by examiner

MECHANICAL PENCIL

FIELD

The present invention relates to a mechanical pencil.

BACKGROUND

In a mechanical pencil, by clicking a click part, for example provided at a rear end part of a cylindrical barrel, a certain amount of lead is fed out from a tip member attached to a front end part side of the cylindrical barrel. The lead is worn along with a writing operation, so it is necessary to click the click part with each certain amount of a writing operation. The optimal amount of the lead fed out by one click operation has been the subject of various studies in the past. If the amount of feed of lead due to one click operation is large, the problem arises of the lead frequently breaking upon receiving writing pressure etc. Further, if the amount of feed of lead due to one click operation is small, the problem arises that it would be necessary to frequently repeat the click operation along with wear of the lead due to the writing operation and the click operation would become troublesome.

Therefore, known in the art is a pipe slide type mechanical pencil which operates so that along with an operation for projection of lead accompanying a click, a pipe shaped lead guide attached to the tip member also advances, the lead is worn along with writing, and the lead guide retracts (see PTL 1 and PTL 2). In the mechanical pencil described in PTL 1 and PTL 2, the front end part of the lead guide contacts the paper surface due to wear of the lead along with writing and the lead guide gradually retracts. For this reason, even if setting the amount of feed of lead due to one click operation somewhat large, the lead is protected by the lead guide and becomes difficult to break.

However, in the mechanical pencil described in PTL 1 and PTL 2, the lead guide is formed by stainless steel or other metal, so if the front end part of the lead guide contacts the paper surface, frictional resistance is received and the feeling in writing becomes poor. Further, the problem also arises that the front end part of the lead guide catches on the paper surface and thereby the paper surface becomes damaged.

As opposed to this, known in the art is a mechanical pencil which, along with wear of the lead, makes the lead guide move so as to gradually retract inside of the tip member to thereby enable the amount of projection of the lead from the lead guide to be maintained in a predetermined range (see PTL 3). In the mechanical pencil described in PTL 3, the writing pressure applied to the lead is utilized so that the front end pipe functioning as the lead guide gradually retracts inside of the tip member. Therefore, the front end pipe retracts in accordance with the wear of the lead, so it is possible to keep the front end pipe from contacting the paper surface and possible to prevent the lead from breaking.

However, in the mechanical pencil described in PTL 3, while it is possible to continue writing for a long time after the front end pipe retracts as well along with wear of the lead, if the lead becomes worn down to a certain extent, in the end, a click operation is required. Due to this click operation, the lead and front end pipe are fed out from the tip member in large amounts, so a strange feeling may arise in the writing resumed due to the position of the front end of the lead.

As opposed to this, known in the art is a mechanical pencil able to utilize the writing pressure accompanying a writing operation so as to successively feed out the lead (see PTL 4).

The mechanical pencil described in PTL 4 has a ball chuck holding the lead, a rotation drive mechanism driving a rotary part to rotate in one direction upon receiving the axial direction retraction operation due to the writing pressure which the lead held by the ball chuck receives and the axial direction advance operation due to the release of the writing pressure, and a lead feed mechanism including a cam member and holding chuck feeding out lead to the front upon receiving a rotational drive force of the rotary part at the rotation drive mechanism.

The lead feed mechanism has a cam member provided with a cam face rising along the circumferential direction and a step part in the axial direction and has a slider provided with an abutting part. The slider is biased to the front by a spring whereby the abutting part abuts against the cam face. Further, the slider is coupled with the rotation drive mechanism and rotates upon receiving rotational drive of the rotation drive mechanism. At this time, the abutting part operates so as to rise along the cam face of the cam member. Along with this, the slider gradually retracts in the axial direction.

Further, if the abutting part of the slider reaches the step part of the cam member, the abutting part moves along the step part and falls in due to the action of the spring biasing the slider. At that instant, the slider also receives an advancing motion corresponding to the height difference of the step part. At this time, the holding chuck arranged inside the slider also similarly advances, so operates so that the lead held while slidingly contacting the holding chuck is pulled out from the ball chuck and the lead is fed out.

CITATIONS LIST

Patent Literature

[PTL 1] Japanese Unexamined Patent Publication No. H8-072473

[PTL 2] Japanese Unexamined Patent Publication No. H8-132782

[PTL 3] Japanese Unexamined Patent Publication No. 2009-233921

[PTL 4] Japanese Unexamined Patent Publication No. 2016-153246

SUMMARY

Technical Problem

The lead feed mechanism of PTL 4 further has a feed adjustment mechanism for adjusting an amount of feed of the lead which is fed out. In the feed adjustment mechanism, the cam member is changed etc. to adjust the height difference of the step part and thereby adjust the amount of feed of the lead. The amount of feed preferably can be adjusted more simply and accurately.

The present invention has as its object the provision of a mechanical pencil enabling simpler and more accurate adjustment of the amount of feed.

Solution to Problem

According to one aspect of the present invention, there is provided a mechanical pencil which comprises a ball chuck allowing advance of the lead and preventing retraction, a rotation drive mechanism having a rotary part and receiving an axial direction retraction operation due to writing pressure received by the lead held by the ball chuck and an axial direction advance operation due to release of the writing pressure to drive the rotary part to rotate in one direction, a feed cam face having a ring-shaped cam face vertical to the axial direction and an axial direction drop difference provided at the ring-shaped cam face, and a slider having an abutting part abutting against the feed cam face and a holding chuck holding a lead and rotating upon receiving a rotation drive force of the rotary part, which is configured so that the lead held by the holding chuck is pulled out from the ball chuck due to the advance operation of the slider when the abutting part moves along the feed cam face according to rotation of the rotary part and the abutting part falls into the drop difference.

It may also be configured so as to adjust the height of the drop difference to adjust the amount of feed of the lead. It may further be comprised of a ring-shaped or cylindrical first cam member and a ring-shaped or cylindrical second cam member arranged at the outside of the first cam member in the diametrical direction and the first cam member and the second cam member may cooperate to configure the feed cam face. One of the first cam member and the second cam member may be formed with a recess, the other of the first cam member and the second cam member may be formed with a cam forming part, and the recess and the cam forming part may cooperate to thereby configure the feed cam face. The cam forming part may be formed into a stepped shape or a slope shape. The first cam member and second cam member may be made to relatively rotate about a center axis to thereby adjust the height of the drop difference. It is also possible to make the first cam member and the second cam member move back and forth relatively to adjust the height of the drop difference. The ball chuck may also be configured to rotate upon receiving the rotational drive force of the rotary part and thereby make the lead rotate.

According to another aspect of the present invention, there is provided a mechanical pencil which comprises a ball chuck allowing advance of the lead and preventing retraction, a rotation drive mechanism having a rotary part and receiving an axial direction retraction operation due to writing pressure received by the lead held by the ball chuck and an axial direction advance operation due to release of the writing pressure to drive the rotary part to rotate in one direction, a feed cam face having a ring-shaped cam face and an axial direction drop difference provided at the ring-shaped cam face, a slider having an abutting part abutting against the feed cam face and a holding chuck holding a lead and rotating upon receiving a rotation drive force of the rotary part, a ring-shaped or cylindrical first cam member, and a ring-shaped or cylindrical second cam member arranged outside from the first cam member in the diametrical direction, the first cam member and the second cam member cooperating to form the feed cam face, and which is configured so that the lead held by the holding chuck is pulled out from the ball chuck due to the advance operation of the slider when the abutting part moves along the feed cam face according to rotation of the rotary part and the abutting part falls into the drop difference.

It may also be configured so as to adjust the height of the drop difference to adjust the amount of feed of the lead. The first cam member may be formed with a first slanted surface, the second cam member may be formed with a second slanted surface, and the first slanted surface and the second slanted surface may cooperate to configure the feed cam face. The first cam member and second cam member may be made to relatively rotate about a center axis to thereby adjust the height of the drop difference. The first cam member and the second cam member may be separated in the axial direction at a relative predetermined rotational position of the first cam member and the second cam member compared with other rotational positions. The first cam member may have a fitting projection, the second cam member may have a plurality of fitting recesses able to fit with the fitting projection, and one of the plurality of fitting recesses may be configured to make the first cam member and the second cam member separate in the axial direction at the predetermined rotational position. It is also possible to make the first cam member and the second cam member move back and forth relatively to adjust the height of the drop difference. The ball chuck may also be configured to rotate upon receiving the rotational drive force of the rotary part and thereby make the lead rotate.

Advantageous Effects of Invention

According to the aspects of the present invention, the common effect is exhibited of provision of a mechanical pencil enabling simpler and more accurate adjustment of the amount of feed.

DESCRIPTION OF EMBODIMENTS

Figure 1:
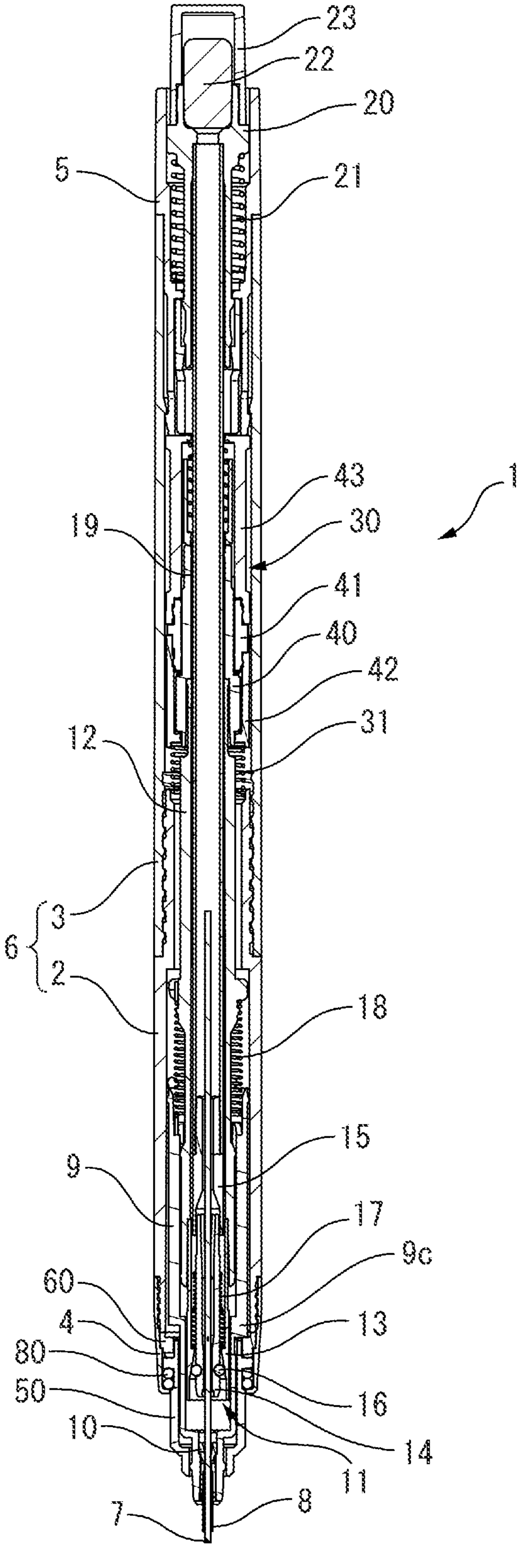
FIG. 1 is a vertical cross-sectional view of a mechanical pencil according to an embodiment of the present invention.

Below, embodiments of the present invention will be explained in detail while referring to the drawings. Throughout the drawings, the corresponding component elements will be assigned common reference notations.

Figure 2:
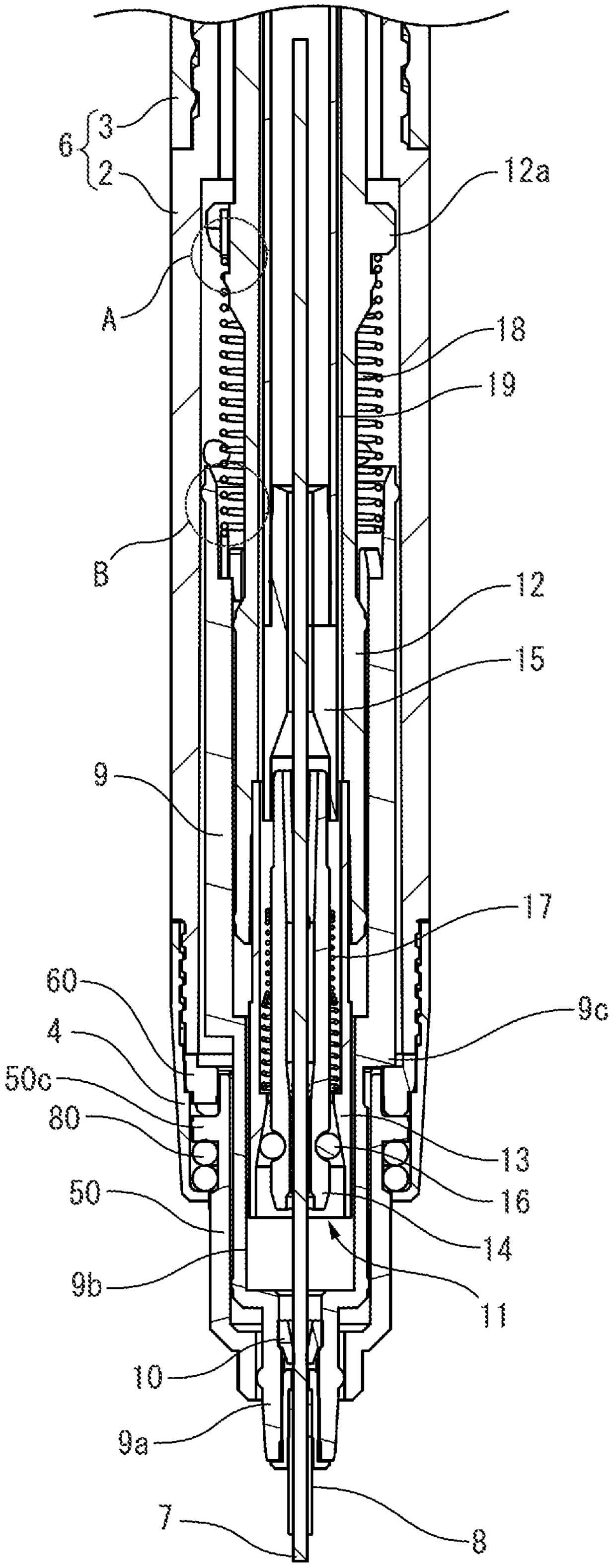
FIG. 2 is an enlarged cross-sectional view of a front half of the mechanical pencil of FIG. 1.
Figure 3:
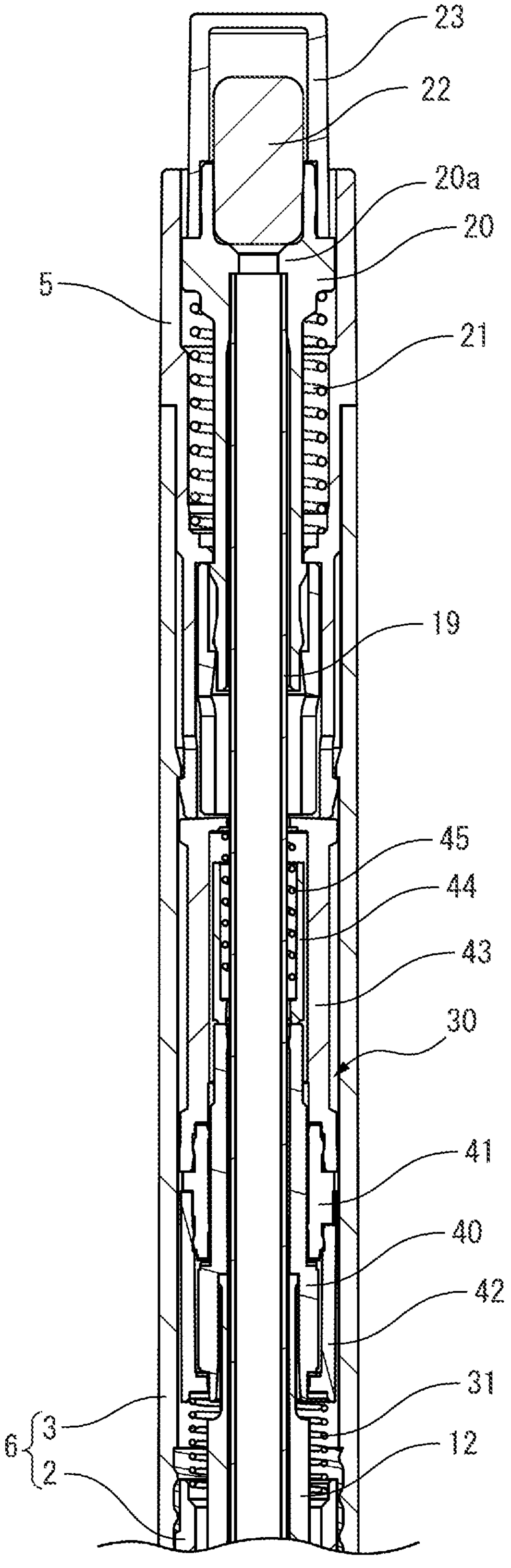
FIG. 3 is an enlarged cross-sectional view of a rear half of the mechanical pencil of FIG. 1.
Figure 4:
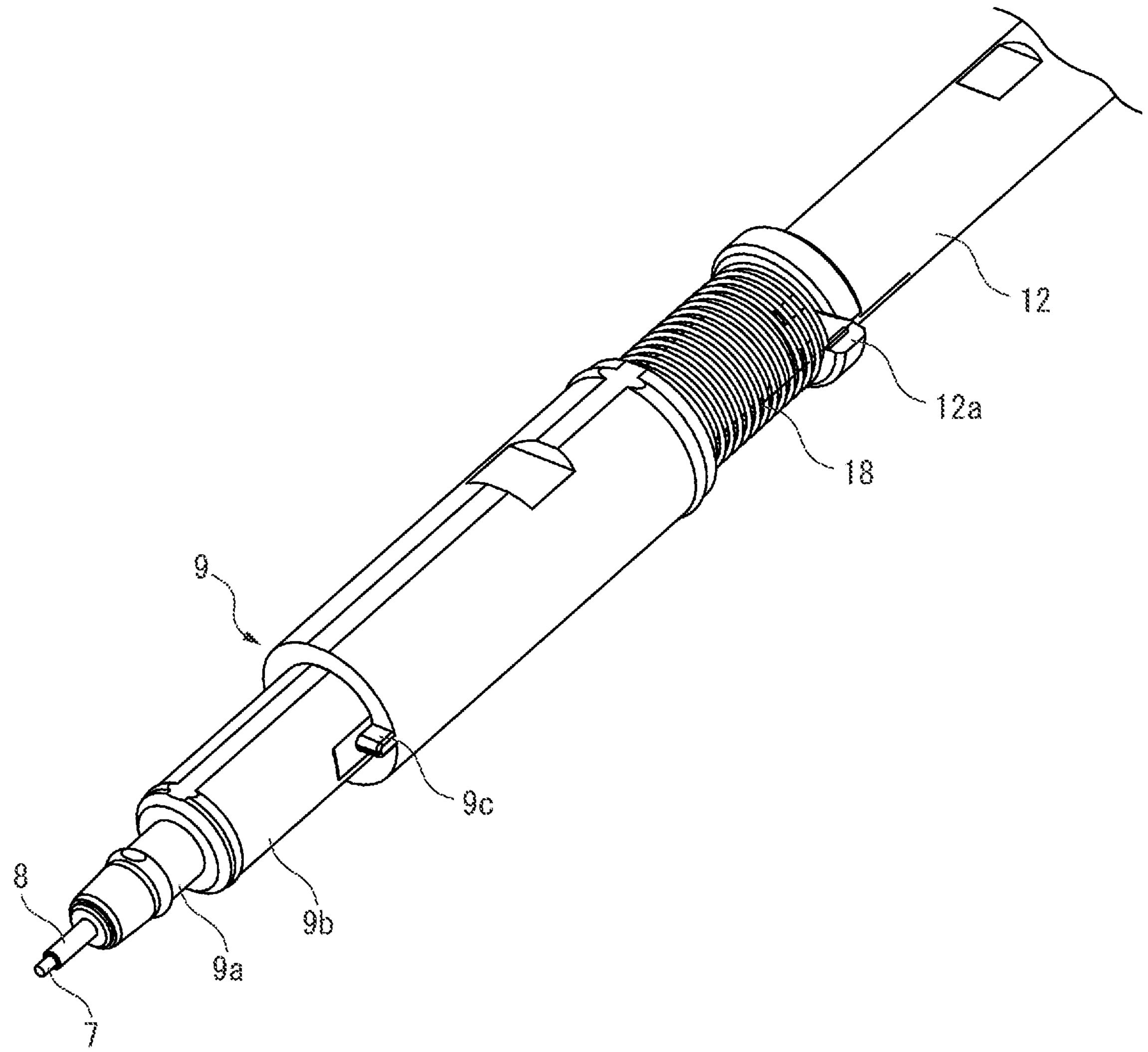
FIG. 4 is a perspective view explaining an internal structure of the mechanical pencil.

FIG. 1 is a vertical cross-sectional view of a mechanical pencil 1 according to an embodiment of the present invention, FIG. 2 is an enlarged cross-sectional view of a front half of the mechanical pencil 1 of FIG. 1, FIG. 3 is an enlarged cross-sectional view of a rear half of the mechanical pencil 1 of FIG. 1, and FIG. 4 is a perspective view explaining an internal structure of the mechanical pencil 1.

The mechanical pencil 1 has a front shaft 2, a rear shaft 3 screwed together with an outer circumferential surface of a rear end part of the front shaft 2, a tip member 4 screwed together with the outer circumferential surface of a front end part of the front shaft 2, and an inner tube 5 fit together with an inner circumferential surface of a rear end part of the rear shaft 3. The front shaft 2 and rear shaft 3 form a cylindrical barrel 6. Note that, the tip member 4 or inner tube 5 may also be included as the "cylindrical barrel 6". As explained later, the mechanical pencil 1 is configured so that the lead 7 projects out from the front end of the tip member 4. The vicinity of the front end of the lead 7 is covered by a front end pipe 8 guiding the lead 7. In this Description, in the axial direction of the mechanical pencil 1, the lead 7 side is defined as the "front" side and the side opposite to the lead 7 side is defined as the "rear" side.

Referring to FIG. 2, inside of the front end part of the cylindrical barrel 6, a slider 9 is arranged to be able to slide in the axial direction and to be able to rotate about its axis. The slider 9 is formed into a cylindrical shape with an outside diameter becoming narrower in stages toward the front. At a front end part 9*a* of the slider 9, the front end pipe 8 is attached. Further, at the front end part 9*a* behind the front end pipe 8, a holding chuck 10 formed by rubber with a through hole at the center is arranged. The through hole of the holding chuck 10 slidingly contacts the outer circumferential surface of the lead 7 and acts to temporarily hold the lead 7.

At the rear part of the outer circumferential surface of an intermediate part 9*b* behind the front end part 9*a* of the slider 9, in particular a base part of the intermediate part 9*b*, an abutting part 9*c* projecting out in the axial direction is formed integrally with the slider 9. At the outer circumferential surfaces of the front end part 9*a* and intermediate part 9*b*, a dial cam member 50 formed by a first cam member formed into a cylindrical shape and a rail cam member 60 formed by a second cam member formed into a ring shape are arranged in a state aligned in the axial direction. Part of the front end part 9*a* of the slider 9 projects out from the hole of the front end part of the dial cam member 50.

At the inside of the slider 9, a ball chuck 11 clutching the lead 7 and a relay member 12 formed into a cylindrical shape are arranged. The ball chuck 11 has a fastener 13 formed into a cylindrical shape, a chuck body 14 arranged inside the fastener 13, a chuck holder 15 formed into a cylindrical shape, and a plurality of balls 16. At the inner circumferential surface of the fastener 13, a taper surface expanding toward the front is formed. The chuck body 14 is formed with a through hole for the lead 7 along its center axis. The front end part of the chuck body 14 is split into a plurality of sections along the axial direction. The rear end part of the chuck body 14 is held by the chuck holder 15. The chuck body 14 and chuck holder 15 can move with respect to the fastener 13 in the axial direction. The plurality of balls 16 are arranged between the inner circumferential surface of the fastener 13 and the outer circumferential surface of the chuck body 14.

If writing pressure is applied to the lead 7, the chuck body 14 abuts against the tapered surface inside the cylindrical shaped fastener 13 together with the balls 16, so the lead 7 is clutched by the chuck body 14. Due to this, retraction of the lead 7 is obstructed. On the other hand, if force acts pulling out the lead 7 to the front, the chuck body 14 does not receive the action due to the fastener 13, so the lead 7 can be pulled out to the front without resistance. That is, the ball chuck 11 acts to allow advance of the lead 7 and obstruct retraction.

A coil spring 17 is arranged so as to surround the chuck body 14. The rear end of the coil spring 17 fits with the outer circumference of the chuck body 14 while the front end of the coil spring 17 is supported by a step part formed at the inner circumferential surface of the fastener 13. The coil spring 17 biases the chuck body 14 to the rear. As a result, the ball chuck 11 can maintain the state of clutching the lead 7.

The outer circumferential surface of the rear end part of the fastener 13 fits with the inner circumferential surface of the front end part of the relay member 12. Therefore, the ball chuck 11 and relay member 12 can move inside the slider 9 in the axial direction. At the center part of the relay member 12 in the axial direction, a flange part 12*a* is formed. At the front of the flange part 12*a*, a cam abutting spring 18 formed by a coil spring is arranged so as to surround the relay member 12. The rear end of the cam abutting spring 18 is attached to the flange part 12*a* of the relay member 12 (part A), while the front end of the cam abutting spring 18 is attached to the inside wall of the rear end part of the slider 9 (part B). Inside the cylindrical barrel 6, the cam abutting spring 18 biases the slider 9 to the front. Due to this, the cam abutting spring 18, as explained later, acts to make an abutting part 9*c* provided at the slider 9 abut against the cam face. The rear end part of the relay member 12 is coupled with a later explained rotation drive mechanism 30. At the outer circumferential surface of the rear end part of the chuck holder 15, a front end part of a lead case 19 is fit. The lead case 19 is formed into a cylindrical shape. Inside, the lead 7 is housed.

Referring to FIG. 3, the rear end part of the cylindrical barrel 6, specifically the rear end part of the inner tube 5, is provided with, as a click member, a click rod 20 able to move back and forth with respect to the cylindrical barrel 6. The click rod 20 is biased to the rear by the coil spring 21. In the vicinity of the rear end part of the click rod 20, a partition wall part 20*a* provided with a refill hole of the lead 7 is formed. Inside of the rear end part of the click rod 20, an eraser 22 is detachably attached. At the outer circumferential surface of the rear end part of the click rod 20, a click cover 23 is detachably attached so the eraser 22 is protected from dirt etc. The click rod 20 fits with the outer circumferential surface of the rear end part of the lead case 19.

By a click operation pushing the click rod 20 or click cover 23 to the front, the lead case 19 advances. Due to this, the chuck body 14 is pushed out to the front through the chuck holder 15. Along with this, the lead 7 clutched by the chuck body 14 also advances whereby the lead 7 is fed out from the front end pipe 8. If the pressure due to the click operation is released, the click rod 20 retracts and returns to its original position due to the biasing force of the coil spring 21.

At this time, the chuck body 14 retracts due to the biasing force of the coil spring 17. On the other hand, the lead 7 is held by the holding chuck 10 arranged inside the slider 9, so due to the action of the ball chuck 11, the lead 7 is pulled out from the chuck body 14 without resistance. As a result, the lead 7 is fed out from the front end pipe 8, so it is possible to feed out a predetermined amount of lead 7 each time repeating the click operation. If maintaining the state of advance of the click rod 20 by the click operation, the state becomes one where the chuck body 14 projects out from the fastener 13 and the clutch of the lead 7 is released. In this state, the lead 7 fed out from the front end pipe 8 can be pushed back by a finger etc.

Figure 5:
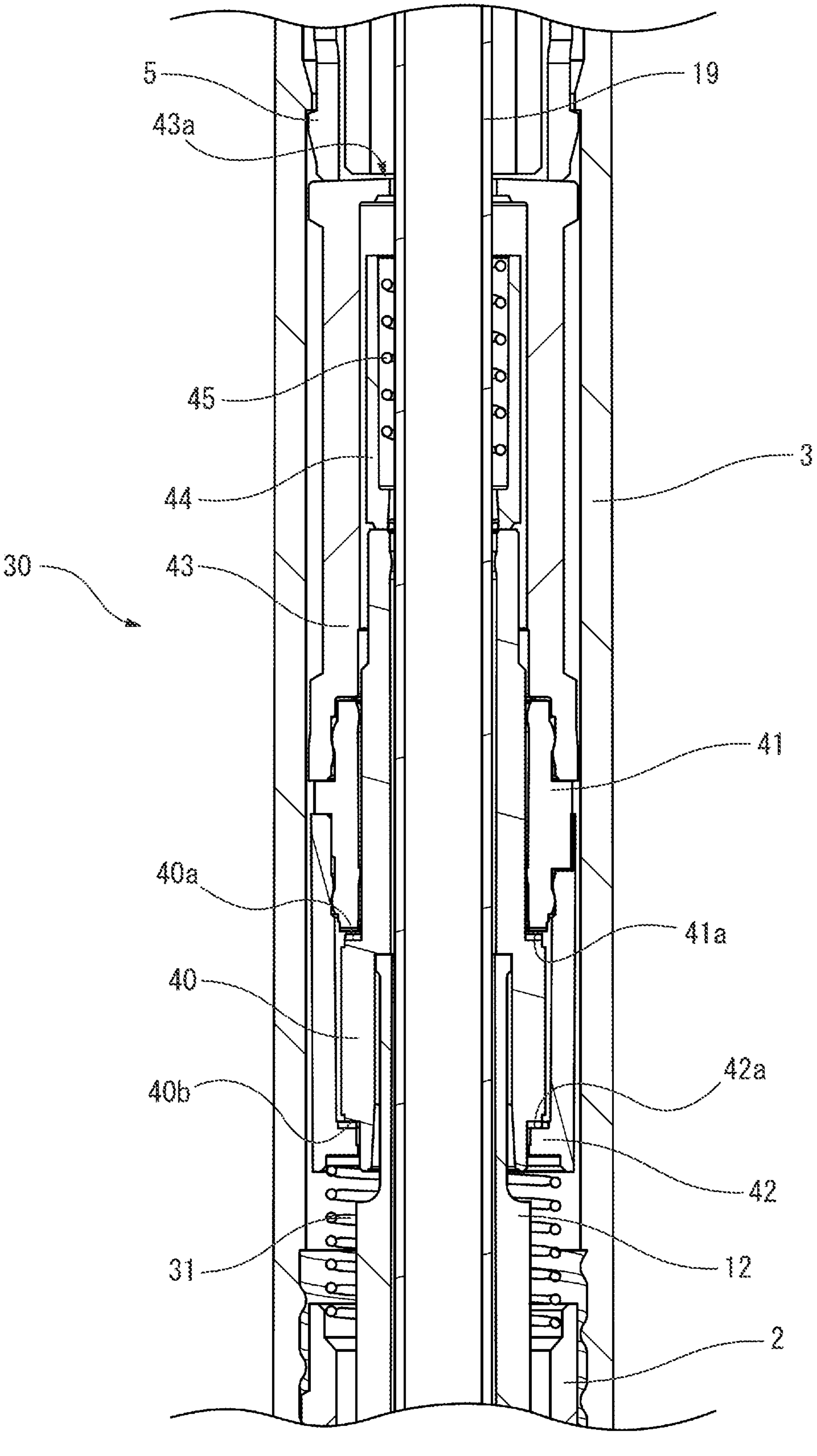
FIG. 5 is an enlarged cross-sectional view of a rotation drive mechanism.

FIG. 5 is an enlarged cross-sectional view of the rotation drive mechanism 30. The rotation drive mechanism 30 is arranged at the inside space of the rear shaft 3. The rotation drive mechanism 30 is connected to the rear end part of the relay member 12. Between the rear end face of the front shaft 2 and the front end face of the rotation drive mechanism 30, a shaft spring 31 is arranged whereby the rotation drive mechanism 30 is biased to the rear. Movement of the rotation drive 30 backward due to the biasing force of the shaft spring 31 is restricted by the rear end face of the rotation drive mechanism 30 abutting against the front end face of the inner tube 5. The lead case 19 passes through the inside of the relay member 12 and rotation drive mechanism 30 and separates from the rotation drive mechanism 30.

The rotation drive mechanism 30 has a rotary part 40 formed into a cylindrical shape, an upper cam forming member 41 formed by a first cam forming member formed into a cylindrical shape, a lower cam forming member 42 formed by a second cam forming member formed into a cylindrical shape, a cylinder member 43 formed into a cylindrical shape, a torque canceller 44 formed into a cylindrical shape, and a coil-shaped cushion spring 45. The rotation drive mechanism 30 is formed into a unit by assembling these members together.

At the inner circumferential surface of the front end part of the rotary part 40, the outer circumferential surface of the rear end part of the relay member 12 is fit. The vicinity of the front end part of the rotary part 40 has a part formed into a flange shape with a just slightly larger diameter. The rear end face of that part is formed with a first cam face 40*a*, and the front end face of that part is formed with a second cam face 40*b*.

The upper cam forming member 41 surrounds the rotary part 40 to be able to rotate at the rear of the first cam face 40*a* of the rotary part 40. The lower cam forming member 42 fits with the outer circumferential surface of the front end part of the upper cam forming member 41. The front end face of the upper cam forming member 41 facing the first cam face 40*a* of the rotary part 40 is formed with a first fixed cam face of a fixed cam face 41*a*. The inside surface of the front end part of the lower cam forming member 42 facing the second cam face 40*b* of the rotary part 40 is formed with a second fixed cam face of a fixed cam face 42*a*.

At the outer circumferential surface of the rear end part of the upper cam forming member 41, a cylinder member 43 formed in a cylindrical shape is fit. The rear end part of the cylinder member 43 is formed with an insertion hole 43*a* through which the lead case 19 can be inserted. Inside the cylinder member 43, a torque canceller 44 formed into a cylindrical shape and able to move in the axial direction is arranged. Between the inner surface of the front end part of the torque canceller 44 and the inner surface of the rear end part of the cylinder member 43, a cushion spring 45 is arranged. The cushion spring 45 biases the rotary part 40 forward through the torque canceller 44.

Here, the relay member 12 transmits the retracting and advancing motions (cushion motion) of the lead 7 based on the writing motion to the rotation drive mechanism 30, that is, the rotary part 40, and transmits the rotational motion of the rotary part 40 at the rotation drive mechanism 30 occurring due to the cushion motion to the ball chuck 11 in the state clutching the lead 7. Therefore, the lead 7 held at the ball chuck 11 also rotates.

Other than when writing by the mechanical pencil 1, that is, when writing pressure is not applied to the lead 7, the rotary part 40 is positioned at the front due to the biasing force of the cushion spring 45 through the torque canceller 44. Therefore, the second cam face 40*b* of the rotary part 40 is rendered a state abutting against and meshing with the second fixed cam face 42*a*. When writing by the mechanical pencil 1, that is, when writing pressure is applied to the lead 7, the ball chuck 11 retracts against the biasing force of the cushion spring 45. Along with this, the rotary part 40 also retracts. Therefore, the first cam face 40*a* of the rotary part 40 is rendered a state abutting against and meshing with the first fixed cam face 41*a*.

Figure 6:
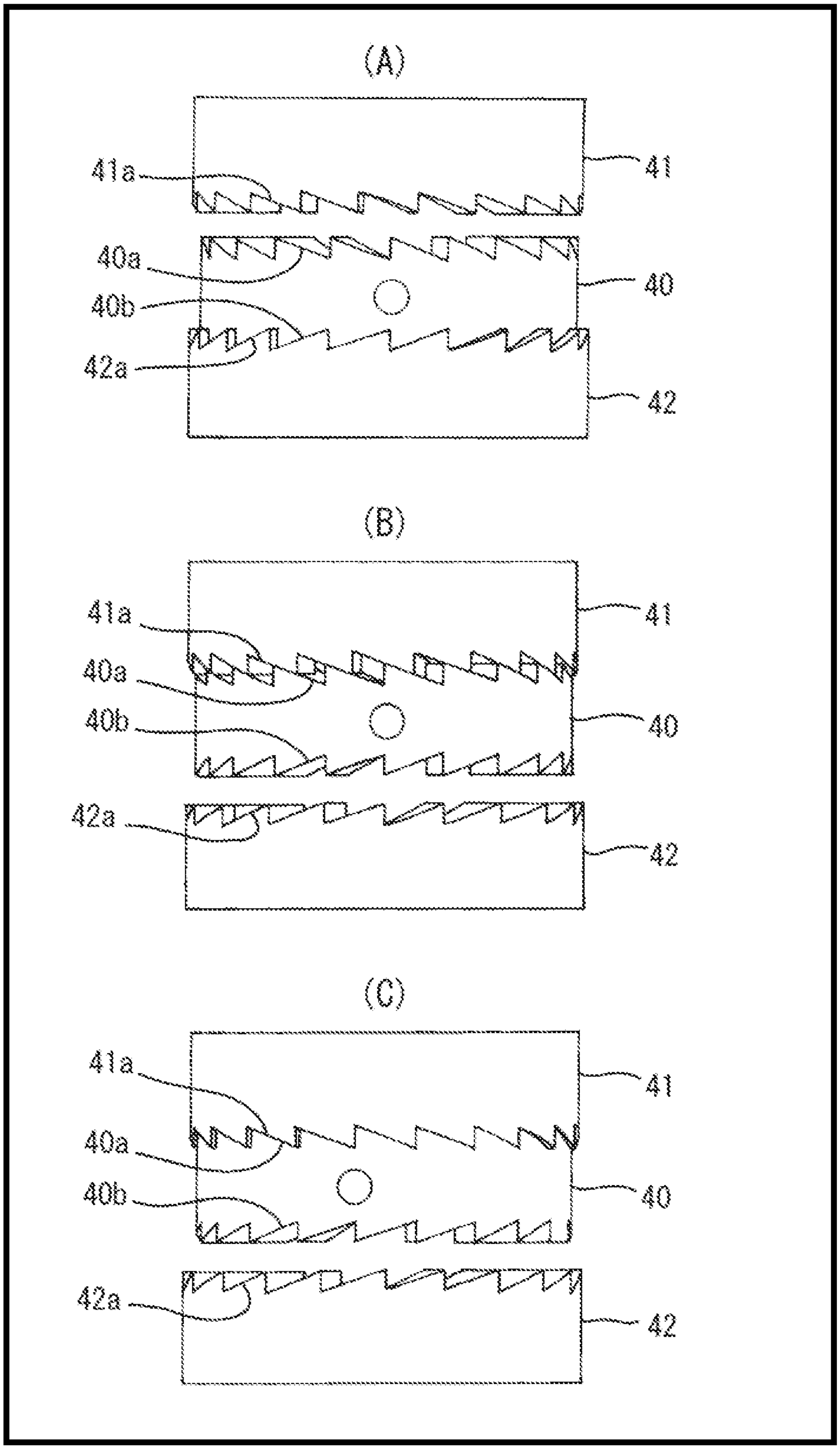
FIG. 6 is a schematic view explaining rotational drive of a rotary part of the rotation drive mechanism.
Figure 7:
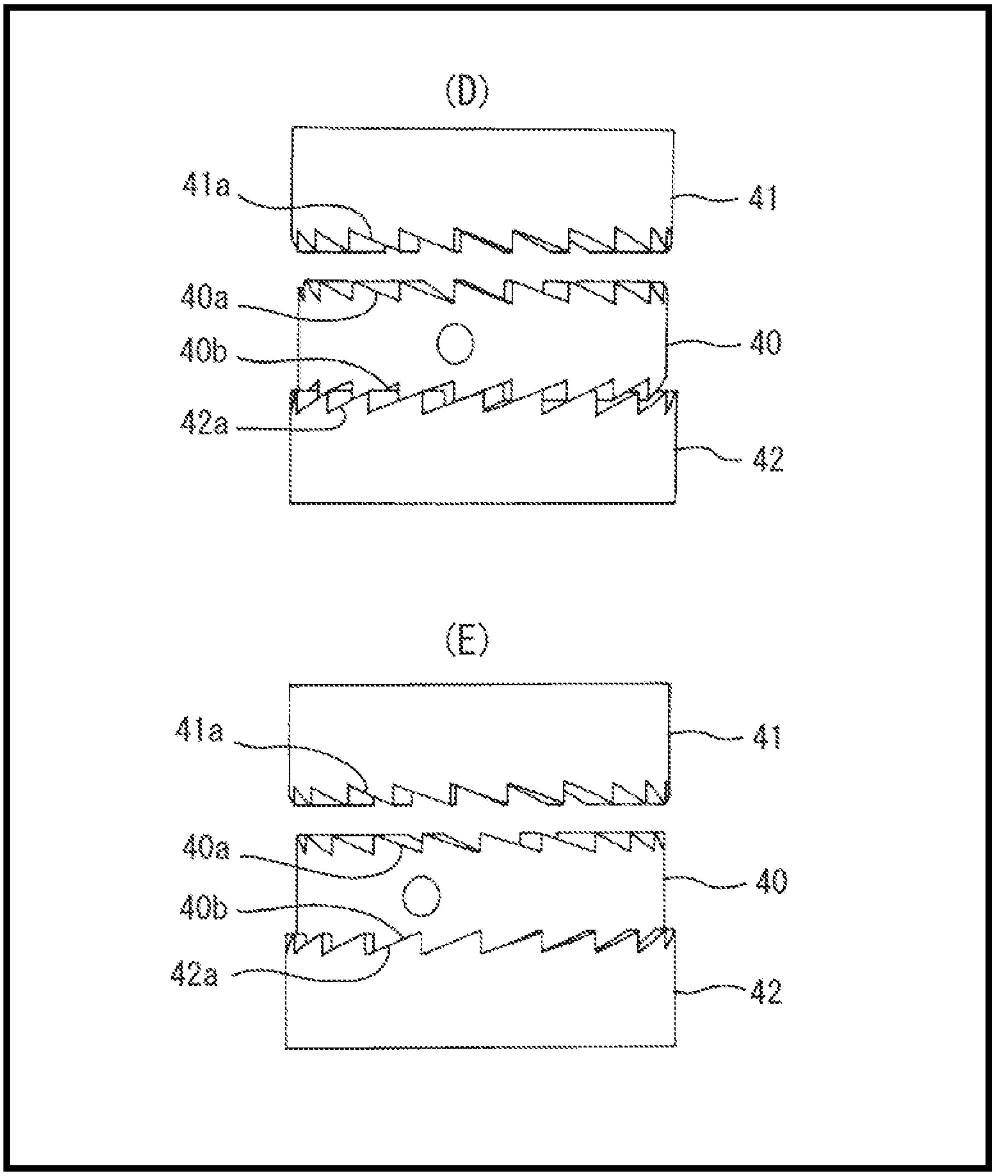
FIG. 7 is a schematic view explaining rotational drive of a rotary part following FIG. 6.

FIG. 6 is a schematic view successively explaining the rotation drive action of the rotary part 40 of the mechanical pencil 1 of FIG. 1, while FIG. 7 is a schematic view explaining the rotation drive action of the rotary part 40 continuing after FIG. 6. In FIG. 6 and FIG. 7, the rear end face formed by the surface at the upper side of the rotary part 40 is formed with the first cam face 40*a* in a ring shape rendered a continuous saw tooth shape along the circumferential direction, while the front end face formed by the surface at the lower side of the rotary part 40 is formed with a second cam face 40*b* in a ring shape similarly rendered a continuous saw tooth shape along the circumferential direction.

The ring-shaped end face of the upper cam forming member 41 facing the first cam face 40*a* of the rotary part 40 is also formed with a first fixed cam face 41*a* rendered a continuous saw tooth shape along the circumferential direction, while the ring-shaped end face of the lower cam forming member 42 facing the second cam face 40*b* of the rotary part 40 is formed with a second fixed cam face 42*a* rendered a continuous saw tooth shape along the circumferential direction. The cam faces of the first cam face 40*a* and second cam face 40*b* formed at the rotary part 40 and the cam faces of the first fixed cam face 41*a* formed at the upper cam forming member 41 and the second fixed cam face 42*a* formed at the lower cam forming member 42 are formed so as to become substantially equal to each other in pitch.

FIG. 6A shows the relationship between the rotary part 50 and the upper cam forming member 41 and lower cam forming member 42 in a state where writing pressure is not being applied to the lead 7. In this state, the second cam face 40*b* formed at the rotary part 40 abuts against the second fixed cam face 42*a* of the lower cam forming member 42 by the biasing force of the cushion spring 45. At this time, the first cam face 40*a* of the rotary part 40 and the first fixed cam face 41*a* of the upper cam forming member 41 are set to become a relationship offset in the axial direction by half a phase (half a pitch) from one tooth of the cams.

FIG. 6B shows the initial state where writing pressure is applied to the lead 7 for writing by the mechanical pencil 1. In such a state, the rotary part 40 retracts while compressing the cushion spring 45 along with retraction of the ball chuck 11. Due to this, the rotary part 40 moves to the first fixed cam face 41*a* side of the upper cam forming member 41.

Next, FIG. 6C shows the state where further writing pressure is applied to the lead 7 and the rotary part 40 abuts against the first fixed cam face 41*a* of the upper cam forming member 41 and retracts. In this state, the first cam face 40*a* of the rotary part 40 meshes with the first fixed cam face 41*a* of the upper cam forming member 41. Due to this, the rotary part 40 is driven to rotate corresponding to half a phase (half a pitch) from one tooth of the first cam face 40*a*.

Note that, the circle marks at the center part of the rotary part 40 in FIG. 6 and FIG. 7 show the amount of rotational movement of the rotary part 40. Further, in the state shown in FIG. 6C, the second cam face 40*b* of the rotary part 40 and the second fixed cam face 42*a* of the lower cam forming member 42 are set to become a relationship offset in the axial direction by half a phase (half a pitch) from one tooth of the cams.

Next, FIG. 7D shows the initial state where writing by the mechanical pencil 1 ends and the writing pressure on the lead 7 is released. In this case, the rotary part 40 advances due to the biasing force of the cushion spring 45. Due to this, the rotary part 40 moves to the lower cam forming member 42 side.

Next, FIG. 7E shows the state where the rotary part 40*a* abuts against the second fixed cam face 42*a* of the lower cam forming member 42 and advances due to the biasing force of the cushion spring 45. In this case, the second cam face 40*b* of the rotary part 40 meshes with the second fixed cam face 42*a* of the lower cam forming member 42. Due to this, the rotary part 40 is again driven to rotate corresponding to half a phase (half a pitch) from one tooth of the second cam face 40*b*.

Therefore, as shown by the circle marks drawn at the center part of the rotary part 40, along with reciprocating movement of the rotary part 40 receiving the writing pressure in the axial direction, that is, forward and backward motion, the rotary part 40 is driven to rotate corresponding to one tooth (1 pitch) of the first cam face 40*a* and second cam face 40*b*. The lead 7 clutched by this is also similarly driven to rotate through the ball chuck 11. Therefore, due to one forward and backward motion of the rotary part 40 in the axial direction due to writing, the rotary part 40 is driven to rotate corresponding to one tooth of the cam. By repeating this, the lead 7 is successively driven to rotate. For this reason, it is possible to prevent the lead 7 from being unevenly worn along with progress in writing and possible to prevent the thickness of the drawn lines and darkness of the drawn lines from greatly changing.

Note that, the torque canceller 44 which receives the biasing force of the cushion spring 45 to push out the rotary part 40 to the front causes sliding between the front end face of the torque canceller 44 and the rear end face of the rotary part 40 to prevent transmission of the rotational movement of the rotary part 40 to the cushion spring 45. That is, due to the torque canceller 44, the rotational movement of the rotary part 40 is prevented from being transmitted to the cushion spring 45. Due to this, twist back (torque) of the cushion spring 45 obstructing the rotational motion of the rotary part 40 is prevented.

Due to the above, the mechanical pencil 1 has the ball chuck 11 and the rotary part 40 and is configured to release and clutch the lead 7 by forward and backward motion of the ball chuck 11 to enable the lead 7 to be fed out to the front. The ball chuck 11 is held inside the cylindrical barrel 6 so as to be able to rotate about the center axis in the state clutching the lead 7 and is configured to make the rotary part 40 rotate by forward and backward motion of the rotary part 40 through the ball chuck 11 due to the writing pressure of the lead 7 and transmit rotational movement of the rotary part 40 through the ball chuck 11 to the lead 7.

Figure 8:
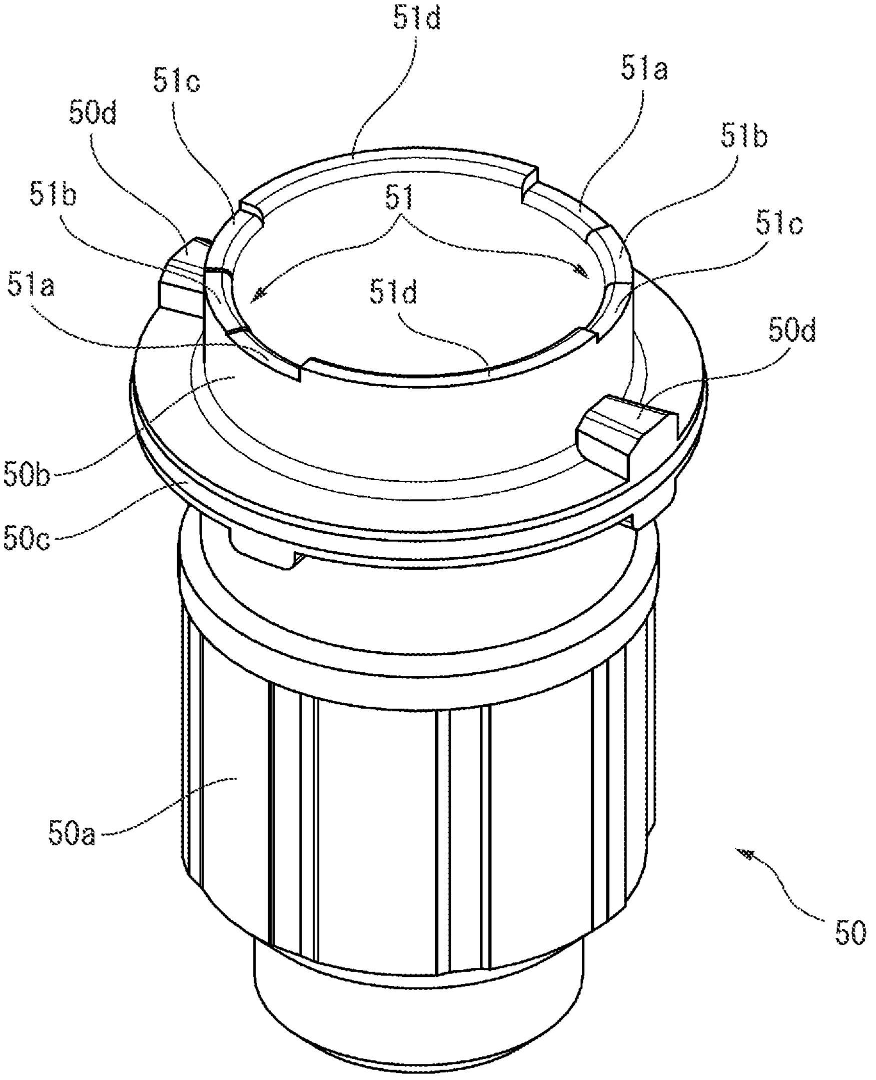
FIG. 8 is a perspective view of a dial cam member.
Figure 9:
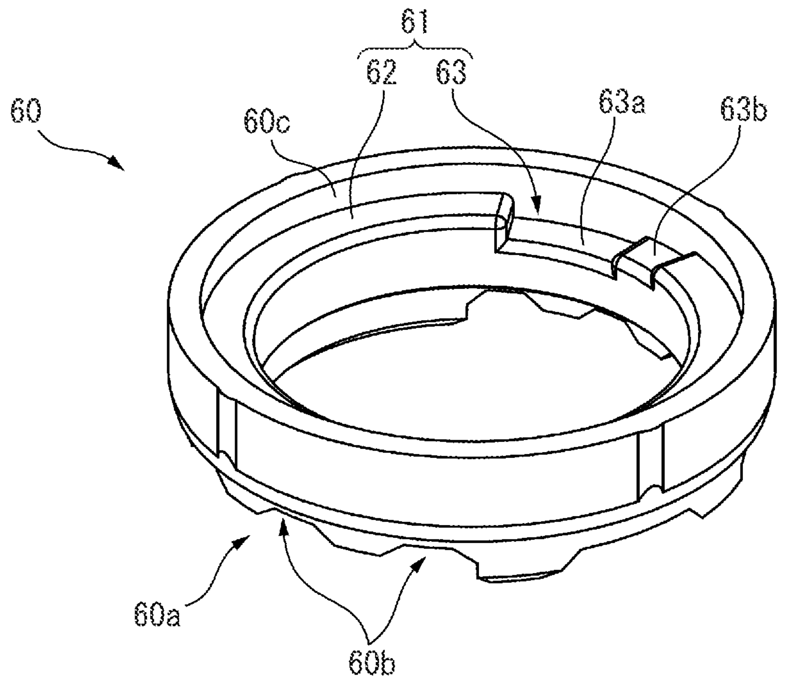
FIG. 9 is a perspective view of a rail cam member.
Figure 10:
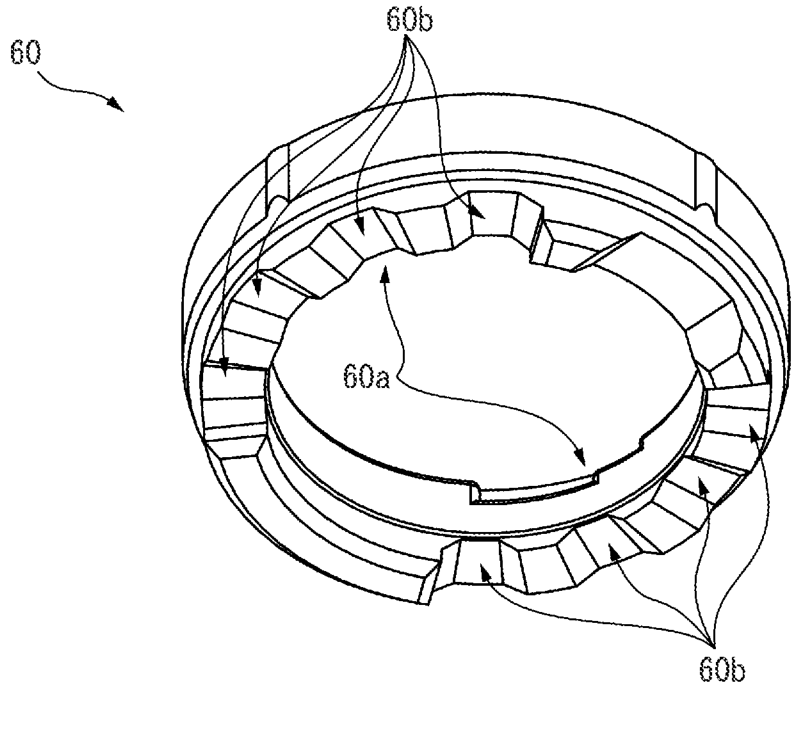
FIG. 10 is another perspective view of a rail cam member.

Referring to FIG. 8 to FIG. 10, the lead feed mechanism and feed adjustment mechanism will be explained. The lead feed mechanism receives the rotational drive force of the rotary part 40 of the rotation drive mechanism 30 and acts to feed out the lead 7 to the front.

FIG. 8 is a perspective view of a dial cam member 50. The dial cam member 50 is arranged so that its upper side becomes the rear side of the mechanical pencil 1 in FIG. 8. The dial cam member 50 is a member formed in a cylindrical shaper and has a grip 50*a* formed with a plurality of grooves extending in the axial direction as antislip parts, a small diameter part 50*b* formed in a smaller diameter than the grip 50*a* at the rear of the grip 50*a*, a flange part 50*c* formed at the small diameter part 50*b*, two fitting projections 50*d* formed at a rear end face of the flange part 50*c*, and a cam forming part of a dial cam 51 formed at the rear end face of the small diameter part 50*b*. Two fitting projections 50*d* are arranged symmetrically about a center axis.

The dial cam 51 has a recess formed at a rear end face of the small diameter part 50*b*, that is, a rear end face of the dial cam member 50. Specifically, the dial cam 51 is formed into a stepped shape by three bottom surfaces provided at the recess. The deepest bottom surface of the recess is the first cam bottom surface 51*a*, the next deepest bottom surface of the recess is the second cam bottom surface 51*b*, and the next deepest bottom surface of the recess is the third cam bottom surface 51*c*. The lengths of the bottom surfaces of the first cam bottom surface 51*a*, second cam bottom surface 51*b*, and third cam bottom surface 51*c*, that is, the lengths along the circumferential direction, are substantially equal. The rear end face of the small diameter part 50*b* is further formed with the same recess, that is, the dial cam 51, symmetrically about the center axis. What actually functions as a cam is the dial cam 51 formed in any one of the recess. This is freely selected at the time of assembly. Note that, the rear end face of the small diameter part 50*b* also forms part of the dial cam 51 as the rear end cam face 51*d*.

FIG. 9 is a perspective view of the rail cam member 60, while FIG. 10 is another perspective view of the rail cam member 60. The rail cam member 60 is arranged so that the upper side becomes the rear side of the mechanical pencil 1 in FIG. 9. The rail cam member 60 is a member formed into a ring shape. The front end face of the rail cam member 60 is formed with two adjusting recesses 60*a* symmetric about the center axis. Each of the adjusting recesses 60*a* is comprised of four fitting recesses 60*b* running alongside each other along the circumferential direction.

At the rear end face of the rail cam member 60, a ring-shaped peripheral wall 60*c* and a rail cam 61 formed at the inside from the peripheral wall 60*c* in the diametrical direction and facing the rear is formed. The rail cam 61 has a flat ring-shaped cam face 62 and a recess 63 formed into a stepped shape at the ring-shaped cam face 62. The ring-shaped cam face 62 is a flat surface vertical to the axial direction. The recess 63 is formed into a stepped shape by two bottom surfaces. The deeper bottom surface of the recess is the first bottom surface 63*a*, while the shallower bottom surface of the recess is the second bottom surface 63*b*. The length of the first bottom surface 63*a*, that is, the length along the circumferential direction, is longer than the length of the second bottom surface 63*b* and is substantially equal to the lengths of the bottom surfaces of the first cam bottom surface 51*a*, second cam bottom surface 51*b*, and third cam bottom surface 51*c*.

Figure 11:
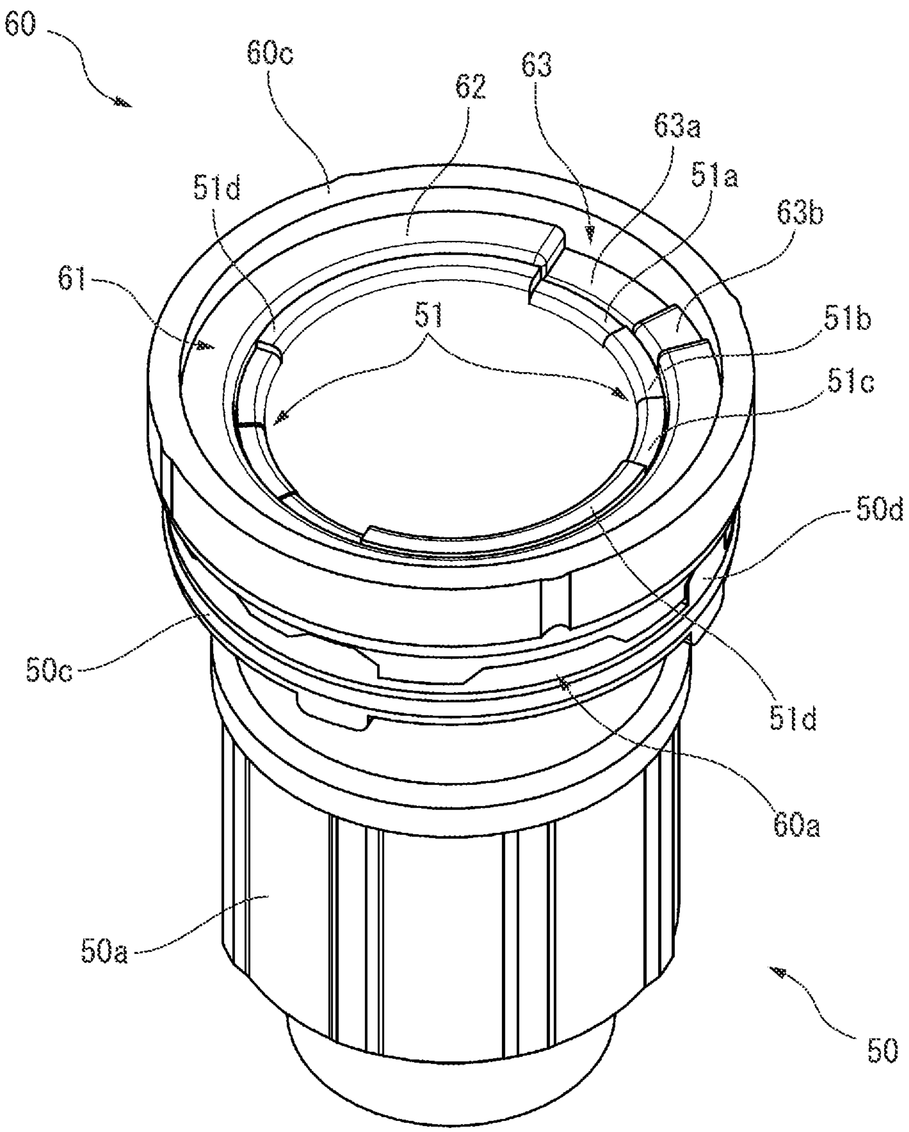
FIG. 11 is a perspective view of a combined dial cam member and rail cam member.

FIG. 11 is a perspective view of the dial cam member 50 and rail cam member 60 combined. The dial cam member 50 and rail cam member 60 are arranged so that the upper sides become the rear side of the mechanical pencil 1 in FIG. 11. The ring-shaped rail cam member 60 is inserted into the rear end part of the small diameter part 50*b* of the dial cam member 50 and is engaged by the flange part 50*c* to thereby be combined. That is, the front end face of the rail cam member 60 abuts against the rear end face of the flange part 50*c* of the dial cam member 50. More specifically, each of the fitting projections 50*d* provided at the flange part 50*c* of the dial cam member 50 fits into one of the fitting recesses 60*b* of the adjusting recess 60*a* of the rail cam member 60. Accordingly, the rail cam member 60 is arranged at the outside of the dial cam member 50 in the diametrical direction.

In the state where the dial cam member 50 and rail cam member 60 are combined, the rear end face of the dial cam member 50 is arranged at substantially the same plane in the adjoining state at the inside in the diametrical direction of the ring-shaped cam face 62 of the rail cam member 60. Further, the dial cam 51 of the dial cam member 50 is arranged in the vicinity of the recess 63 of the rail cam member 60. Due to this, the dial cam member 50, specifically the dial cam 51 formed by the cam forming part, and the rail cam member 60, specifically the rail cam 61, more specifically the recess 63, cooperate to form a continuous, that is, ring-shaped, feed cam face 70 in the circumferential direction.

As shown in FIG. 2, the dial cam member 50 and rail cam member 60 are arranged at the outside of the front end part 9*a* and the intermediate part 9*b* of the slider 9 in the combined state. Part of the dial cam member 50 and the rail cam member 60 are covered by the tip member 4 at their outer circumferential surfaces. An O-ring 80 is arranged between the inner surface of the front end part of the tip member 4 and the flange part 50*c* of the dial cam member 50. Further, the cam abutting spring 18 biases the slider 9 to the front, so the abutting part 9*c* of the slider 9 maintains a state abutting against the feed cam face 70. The dial cam member 50 and rail cam member 60 are restricted in movement to the rear by the top surface of the peripheral wall 60*c* formed by the rear end face of the rail cam member 60 abutting against the front end face of the front shaft 2. Further, the outer circumferential surface of the rail cam member 60 engages with the inner circumferential surface of the tip member 4 whereby rotation of the rail cam member 60 with respect to the tip member 4 and in turn the cylindrical barrel 6 is restricted.

The shape of the feed cam face 70 can be changed by making the dial cam member 50 and rail cam member 60 rotate relatively around the center axis. That is, a user grips the cylindrical barrel 6 with one hand and grips the grip 50*a* of the dial cam member 50 projecting out from the front end of the cylindrical barrel 6 with the other hand while making the dial cam member 50 rotate about the center axis with respect to the cylindrical barrel 6. The rail cam member 60 engages with the cylindrical barrel 6, so the dial cam member 50 rotates about the center axis with respect to the rail cam member 60.

The dial cam member 50 is rotated with respect to the rail cam member 60 in a stepped manner so that the fitting projections 50*d* of the dial cam member 50 move from fitting recesses 60*b* of the corresponding rail cam member 60 and fit into the adjoining fitting recesses 60*b*.

Therefore, the dial cam member 50 is rotated with respect to the rail cam member 60 about its center axis in a stepped manner in the range of the adjusting recesses 60*a* of the rail cam member 60 in which the fitting projections 50*d* of the dial cam member 50 can move. The relative positions of the rail cam 61 of the rail cam member 60, specifically, the recess 63, and the dial cam 51 of the dial cam member 50 change in accordance with the positions of the fitting recesses 60*b* of the rail cam member 60 in which the fitting projections 50*d* of the dial cam member 50 fit. As a result, the shape of the feed cam face 70 can be changed. The dial cam member 50 is biased with respect to the rail cam member 60 by the O-ring 80. A click feeling is obtained at the time of the stepped-like rotation of the dial cam member 50 with respect to the rail cam member 60. The change of the shape of the feed cam face 70 will be further explained while referring to FIG. 12 and FIG. 13.

Figure 12:
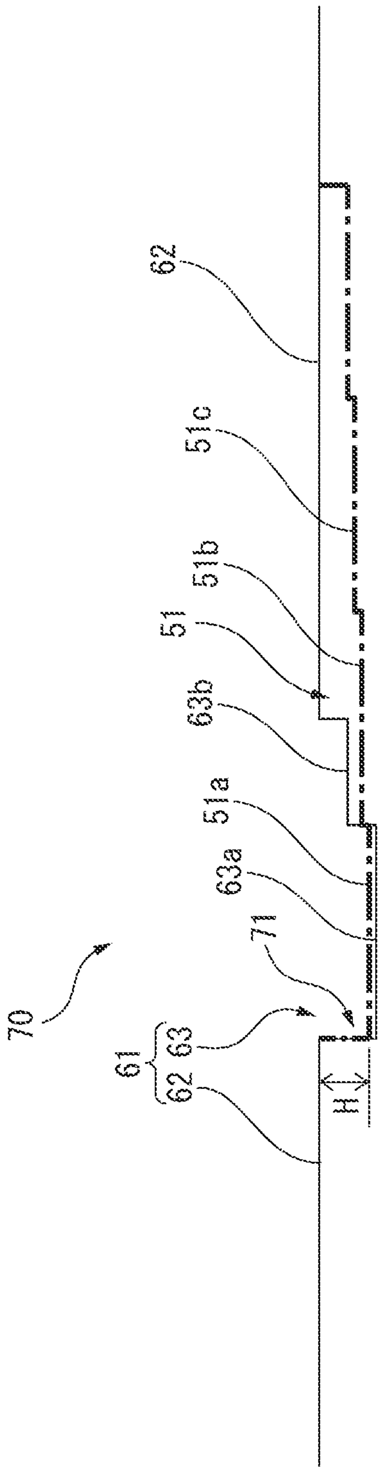
FIG. 12 is a schematic view showing a feed cam face when the amount of feed is large.
Figure 13:
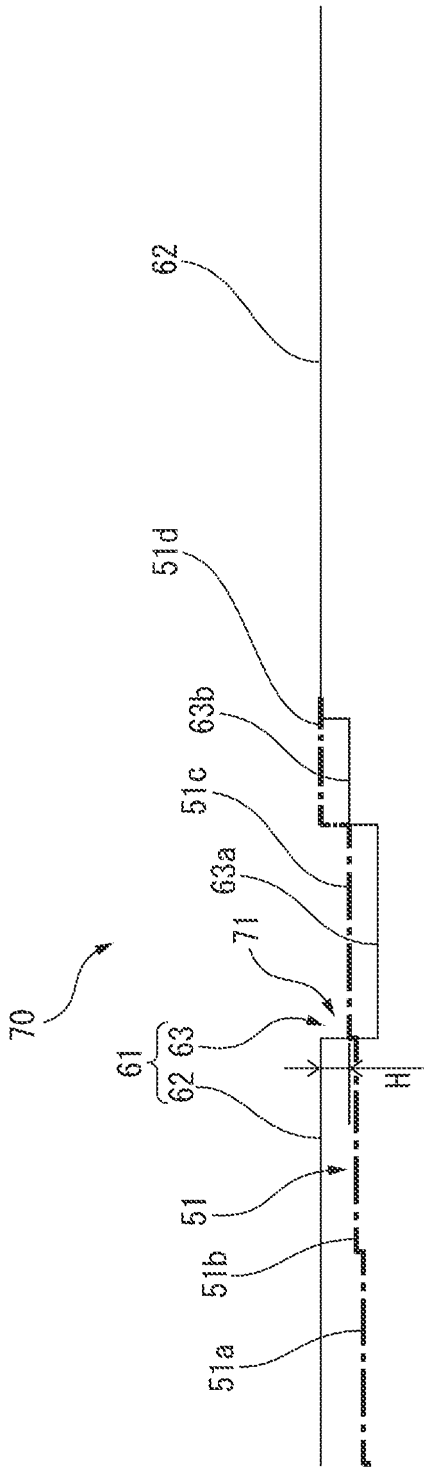
FIG. 13 is a schematic view showing a feed cam face when the amount of feed is small.

FIG. 12 is a schematic view showing the feed cam face 70 when the amount of feed is large, while FIG. 13 is a schematic view showing the feed cam face 70 when the amount of feed is small. FIG. 12 and FIG. 13 show the positional relationship of the dial cam member 50 and rail cam member 60 by laying out in the circumferential direction the cylindrical surface around the center axis including the feed cam face 70. In FIG. 12 and FIG. 13, the upper side is the rear side of the mechanical pencil 1.

Referring to FIG. 12, the dial cam member 50 is made to be positioned with respect to the rail cam member 60 so that the first bottom surface 63*a* of the rail cam 61 and the first cam bottom surface 51*a* of the dial cam 51 are aligned in the diametrical direction. In other words, the embodiment is configured so that the fitting projections 50*d* of the cam member 50 and the fitting recesses 60*b* of the rail cam member 60 correspond so that the first bottom surface 63*a* of the rail cam 61 and the first cam bottom surface 51*a* of the dial cam 51 are aligned in the diametrical direction. The first cam bottom surface 51*a* of the dial cam 51 is on the same plane as the first bottom surface 63*a* of the rail cam 61 or is arranged just slightly to the rear from the first bottom surface 63*a*. Therefore, the first cam bottom surface 51*a* of the dial cam 51 or the first bottom surface 63*a* of the recess 63, the second bottom surface 63*b* of the recess 63, and the ring-shaped cam face 62 form the feed cam face 70. Note that, the height (height difference) of the step part 71 (drop difference) in the recess 63 in the axial direction at the feed cam face 70 is made the step height H. In FIG. 12, the step height H is the distance between the ring-shaped cam face 62 of the rail cam 61 and the first cam bottom surface 51*a* of the dial cam member 50 or the first bottom surface 63*a* of the recess 63.

Referring to FIG. 13, the dial cam member 50 is made to be positioned relative to the rail cam member 60 so that the first bottom surface 63*a* of the rail cam 61 and the third cam bottom surface 51*c* of the dial cam 51 are aligned in the diametrical direction. The rear end can face 51*d* of the dial cam 51 is on substantially the same plane as the ring-shaped cam face 62 of the rail cam 61. Therefore, the third cam bottom surface 51*c* of the dial cam 51, the rear end cam face 51*d*, and the ring-shaped cam face 62 form the feed cam face 70. In FIG. 13, the step height H is the distance between the ring-shaped cam face 62 of the rail cam 61 and the third cam bottom surface 51*c* of the dial cam member 50.

Similarly, the dial cam member 50 can be made to be positioned relative to the rail cam member 60 so that the first bottom surface 63*a* of the rail cam 61 and the second cam bottom surface 51*b* of the dial cam 51 are aligned in the diametrical direction. In this case, the second cam bottom surface 51*b* of the dial cam 51, the second bottom surface 63*b* of the recess 63, and the ring-shaped cam face 62 form the feed cam face 70. At this time, the step height H is the distance between the ring-shaped cam face 62 of the rail cam 61 and the second cam bottom surface 51*b* of the dial cam member 50.

Similarly, the dial cam member 50 can be made to be positioned relative to the rail cam member 60 so that the first bottom surface 63*a* of the rail cam 61 and the rear end cam face 51*d* of the dial cam 51 are aligned in the diametrical direction. In this case, the rear end cam face 51*d* of the dial cam 51 and the ring-shaped cam face 62 form the feed cam face 70. At this time, the rear end cam face 51*d* of the dial cam 51 is on substantially the same plane as the ring-shaped cam face 62 of the rail cam 61, so the step height H is zero.

The rotary part 40 of the rotation drive mechanism 30 gradually drives the slider 9 to rotate based on the cushion motion of the lead 7. That is, when viewing the front end part 9*a* of the slider 9 first, the slider 9 rotates to the right about the center axis. Due to this rotational movement, the abutting part 9*c* of the slider 9 moves in the circumferential direction while cooperating with the feed cam face 70. The relationship between the abutting part 9*c* and the feed cam face 70 and the feed of the lead 7 will be explained while referring to FIG. 14.

Figure 14:
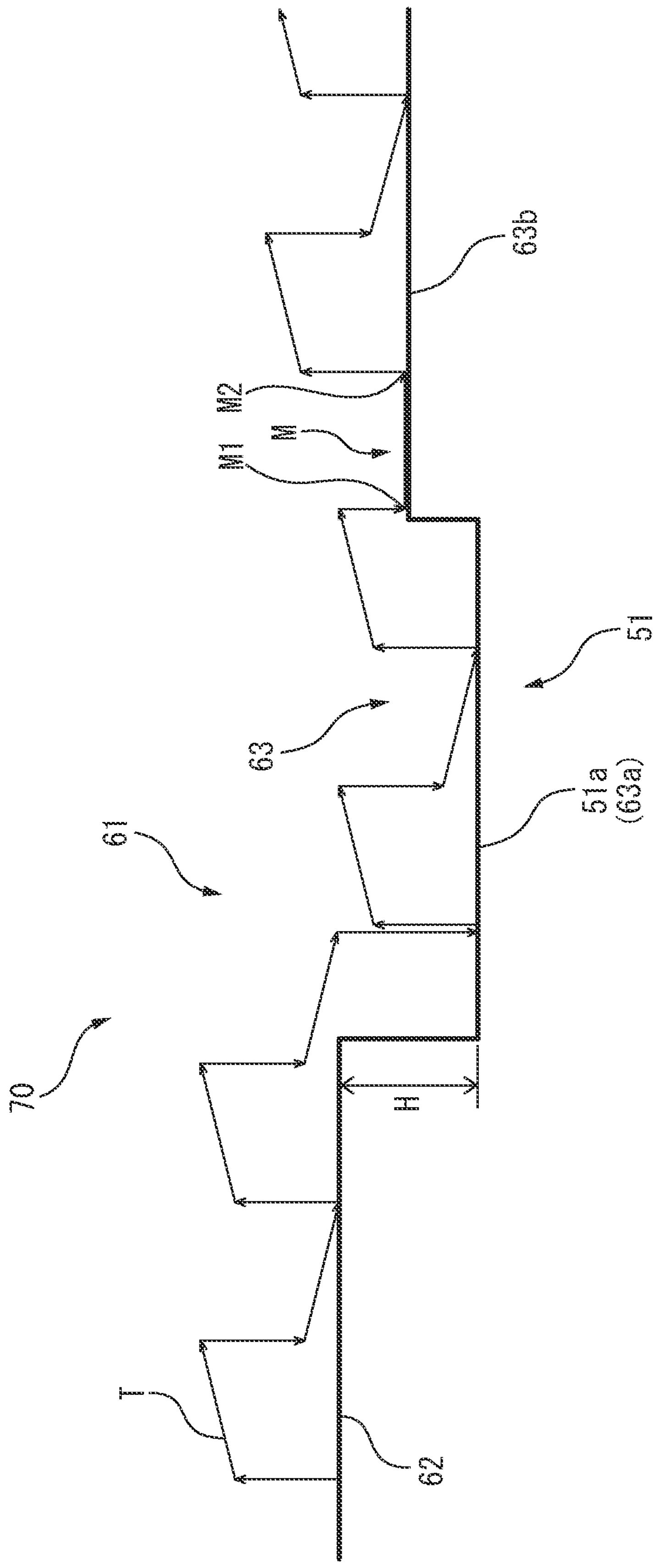
FIG. 14 is a schematic view showing a relationship of a feed cam face and movement of abutting part.

FIG. 14 is a schematic view showing a relationship between the feed cam face 70 and movement of the front end part of the abutting part 9*c*. FIG. 14 shows the positional relationship with the abutting part 9*c* at the feed cam face 70 by laying out in the circumferential direction the cylindrical surface around the center axis including the feed cam face 70. In FIG. 14, the upper side is the rear side of the mechanical pencil 1.

In FIG. 14, the state of the feed cam face 70 shown in FIG. 12 is used as an example. In FIG. 14, the abutting part 9*c* moves from the left to the right. More particularly, as explained while referring to FIG. 6 and FIG. 7, the rotary part 40 rotates while moving front and back along the cam face between the upper cam forming member 41 and lower cam forming member 42. For this reason, the front end of the abutting part 9*c* follows the path T shown by the arrow marks in FIG. 14.

First, the abutting part 9*c* moves along the ring-shaped cam face 62 of the feed cam face 70. Next, the abutting part 9*c* is pushed by the biasing force of the cam abutting spring 18, falls inside the recess 63, and moves to the front until abutting against the first cam bottom surface 51*a* of the dial cam 51. That is, the slider 9 moves more to the front than the ring-shaped cam face 62 by exactly the step height H of the step part 71. At this time, the holding chuck 10 arranged inside the slider 9 similarly moves to the front, so the lead 7 held at the holding chuck 10 is pulled out from the ball chuck 11 and is fed out relatively from the front end pipe 8 by exactly the amount of the step height H. Therefore, the amount of the lead 7 fed out, that is, the amount of feed, is equal to the step height H.

Next, abutting part 9*c* moves along the stepped shaped recess 63 along with the cushion motion of the lead 7, specifically so as to rise on the second bottom surface 63*b*, to thereby move to the rear while again returning to the ring-shaped cam face 62. Next, the abutting part 9*c* again moves along the ring-shaped cam face 62 of the feed cam face 70. Due to the above motion, it is possible to feed out the lead 7 from the front end pipe 8 each time the abutting part 9*c* circles along the feed cam face 70. By repeating this motion, the lead 7 is successively fed out while the lead 7 is worn down along with a writing motion.

In short, the lead feed mechanism is configured so that when the abutting part 9*c* moves along the feed cam face 70 in accordance with rotation of the rotary part 40 and the abutting part 9*c* falls in the step part 71 of the feed cam face 70, the advance motion of the slider 9 causes the lead 7 held by the holding chuck 10 to be pulled out from the ball chuck 11. The lead feed mechanism can utilize the step part 71 of the feed cam face 70 to convert the rotational drive force of the rotary part 40 at the rotation drive mechanism 30 to a feed motion of the lead 7.

In the mechanical pencil described in PTL 4, the cam face is formed so as to rise up along the circumferential direction, so the abutting part receives the force component in the direction against the biasing force of the spring in addition to the frictional resistance. This becomes a factor obstructing rotation of the rotation drive mechanism. On the other hand, in the mechanical pencil 1 of the above-mentioned embodiment, the ring-shaped cam face 62 is formed vertical to the axial direction, so the force component in the direction against the biasing force of the cam abutting spring 18 is not received and the rotation of the rotation drive mechanism 30 is not obstructed. Therefore, it is possible to realize a feed operation of the lead 7 with a highly reliable precision.

Further, the mechanical pencil 1 is configured to drive rotation of the lead 7 held by the ball chuck 11 upon receiving the rotational drive force of the rotary part 40 at the rotation drive mechanism 30. Therefore, it is possible to prevent uneven wear of the lead 7 along with the progress in writing and as a result it is possible to prevent the thickness of the drawn lines or the darkness of the drawn lines from greatly changing.

Further, in the feed adjustment mechanism, as explained above, by making the dial cam member 50 and rail cam member 60 just rotate relatively around the center axis, it is possible to change the step height H of the step part 71 at the feed cam face 70. Accordingly, it is possible to more simply and accurately adjust the amount of feed of the lead 7 by the lead feed mechanism.

If making adjustments so that the extent of wear of the lead 7, which differs depending on the writing pressure, itself varying depending on the user, the hardness of the lead 7 used, etc., and the amount of feed of the lead 7 substantially match, it is possible to hold continuously constant the amount of projection of the lead 7 from the front end pipe 8 regardless of the writing motion. As a result, in the mechanical pencil 1, it is possible to continue writing for a long time by a single click operation. It is preferable to form the dial cam 51 so that the step part 71 having the step height H corresponding to a length exceeding the extent of wear of the lead 7 normally envisioned is formed. Due to this, it becomes possible to set the amount of feed of the lead 7 corresponding to the preferences of all users.

Specifically, in the above-mentioned embodiment, the step height H of the step part 71 can be changed to four stages as the distance between the ring-shaped cam face 62 and the first cam bottom surface 51*a*, second cam bottom surface 51*b*, third cam bottom surface 51*c*, or rear end cam face 51*d*. For example, the step height H can be made 0.15 mm, 0.10 mm, 0.05 mm, or 0 mm. Therefore, for example, a user with a strong writing pressure and with a larger extent of wear of the lead 7 could adjust the feed adjustment mechanism so that the step height H becomes 0.15 mm, while a user with a weak writing pressure and with a smaller extent of wear of the lead 7 could adjust the feed adjustment mechanism so that the step height H becomes 0.05 mm. Furthermore, a user not liking automatic feed of the lead 7 and wanting to feed out lead 7 by a click operation can adjust the feed adjustment mechanism so that the step height H becomes 0 mm (zero).

In the above-mentioned embodiment, the dial cam 51 was formed in a stepped shape by the three bottom surfaces provided in the recess at the rear end face, but the dial cam 51 may also be formed by two bottom surfaces or four or more bottom surfaces. In this case, it is possible to adjust the amount of feed of the lead 7 by the lead feed mechanism in a stepped manner in accordance with the number of the bottom surfaces. Therefore, the greater the number of the bottom surfaces, the finer the units, for example, 0.02 mm units, by which the step height H can be set. Accordingly, finer adjustment of the amount of feed is possible. Further, it is also possible to provide just one bottom surface at the recess of the dial cam member 50 corresponding to the recess 63 at the feed cam face 70 and configure the dial cam member 50 to be able to move relative to the rail cam member 60 in the axial direction. In this case, by making the dial cam member 50 move back and forth relative to the rail cam member 60, that is, by making the dial cam member 50 and rail cam member 60 move back and forth relative to each other, it becomes possible to change the step height H. At this time, the step height H may also be made able to be changed steplessly.

In the above-mentioned embodiment, the step part was formed by a single step, but it may also be formed by a plurality of steps insofar as similar height differences are obtained and the lead 7 is fed out. Further, the step part may also be a flat slanted surface or curved surface instead of a step insofar as similar height differences are obtained and the lead 7 is fed out. The configuration for forming the height difference at the ring-shaped cam face will be referred to all together as the "drop difference".

Figure 15:
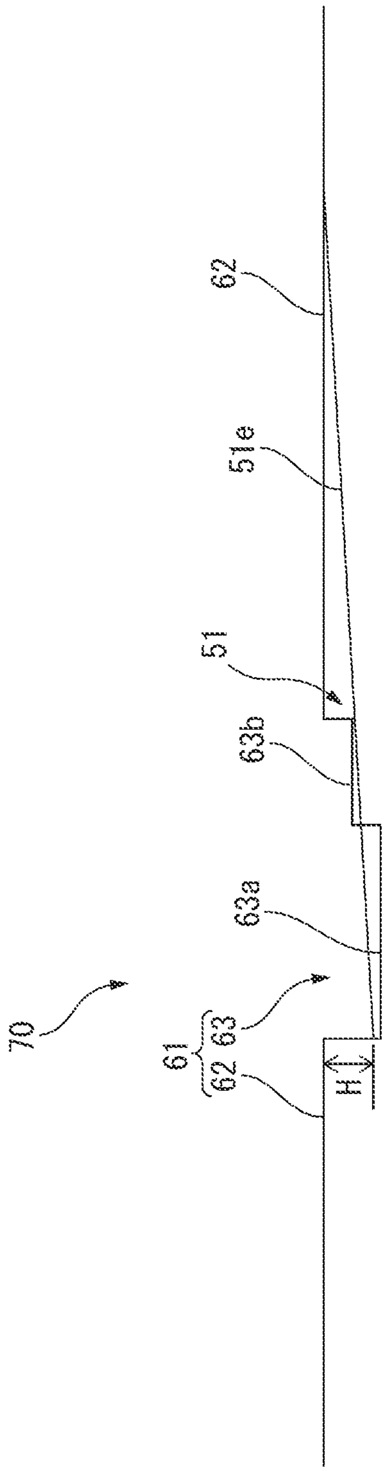
FIG. 15 is a schematic view showing another feed cam face.

FIG. 15 is a schematic view showing another feed cam face 70. In FIG. 15, the upper side is the rear side of the mechanical pencil 1. In the above-mentioned embodiment, the dial cam 51 formed by the cam forming part forming the feed cam face 70 cooperated with the recess 63 of the rail cam 61 was formed into a stepped shape. However, as shown in FIG. 15, the dial cam 51 may be formed as a slanted surface 51*e* running along the circumferential direction such as a slope shape or spiral shape. In this case, the fitting projections 50*d* of the dial cam member 50 and the fitting recesses 60*b* of the rail cam member 60 do not make the dial cam member 50 and rail cam member 60 rotate in a stepped manner about the center axis. They can be configured to be able make them rotate steplessly so as to change the step height H of the step part 71 steplessly. As a result, it is possible to adjust the amount of feed more finely.

In the above-mentioned embodiment, the dial cam member 50 was a cylindrical member functioning as the first cam member, but it may also be a ring-shaped member. Further, the rail cam member 60 was a ring-shaped member functioning as the second cam member, but it may also be a cylindrical member. The rail cam 61 may also be provided at the first cam member and the dial cam 51 may also be provided at the second cam member. That is, the ring-shaped or cylindrical first cam member and the ring-shaped or cylindrical second cam member arranged at the outside of the first cam member in the diametrical direction may cooperate to form the feed cam face.

Therefore, one of the first cam member and second cam member may be formed with the recess, the other of the first cam member and second cam member may be formed with the cam forming part, and the recess and the cam forming part may cooperate to form the feed cam face. The first cam member and second cam member may be made to rotate relative to each other about the center axis to thereby adjust the step height of the step part. Further, the first cam member and second cam member may be made to move back and forth relative to each other to thereby adjust the step height of the step part.

The feed adjustment mechanism was used to adjust the amount of feed of the lead 7 by the lead feed mechanism, but the feed adjustment mechanism may also be omitted. That is, a cam member provided with a feedout cam face having a ring-shaped cam face vertical to the axial direction and a predetermined step part provided at the ring-shaped cam face in the axial direction may also be attached to a cylindrical barrel. Such a configuration can, for example, be realized in the above-mentioned embodiment by a configuration omitting the dial cam member 50 and having only the rail cam member 60. In the above-mentioned embodiment, the ring-shaped cam face 62 was a flat surface vertical to the axial direction, but it may also be a slope shaped or spiral shaped cam face provided on the ring-shaped end face so as to rise along the circumferential direction.

Figure 16:
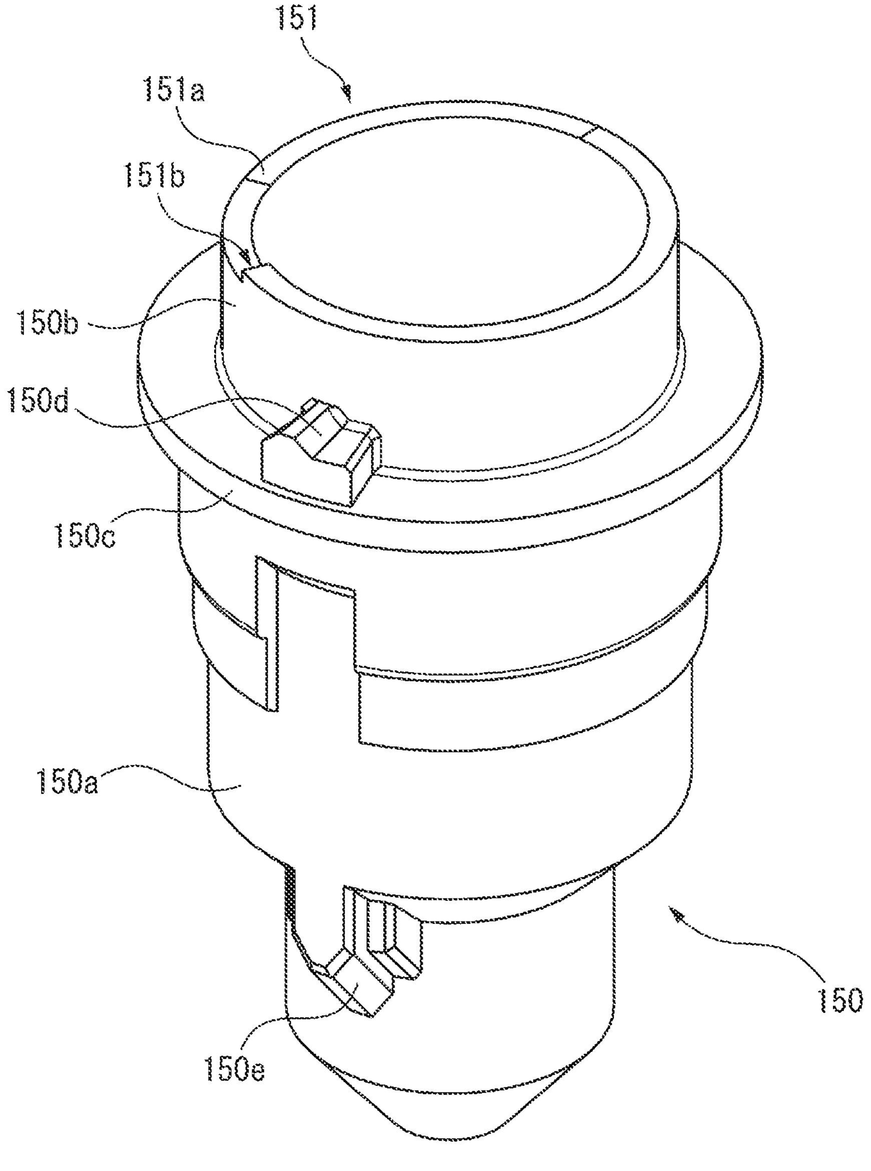
FIG. 16 is a perspective view of another dial cam member.
Figure 17:
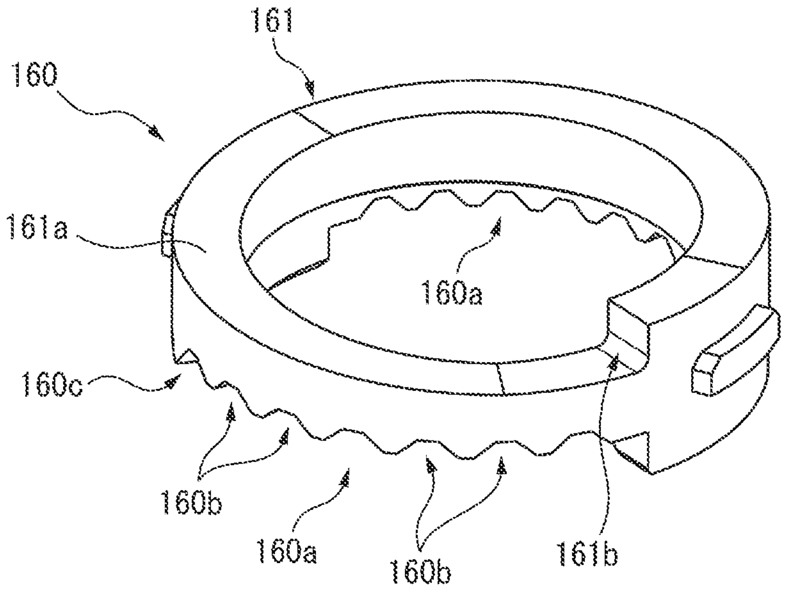
FIG. 17 is a perspective view of another rail cam member.
Figure 18:
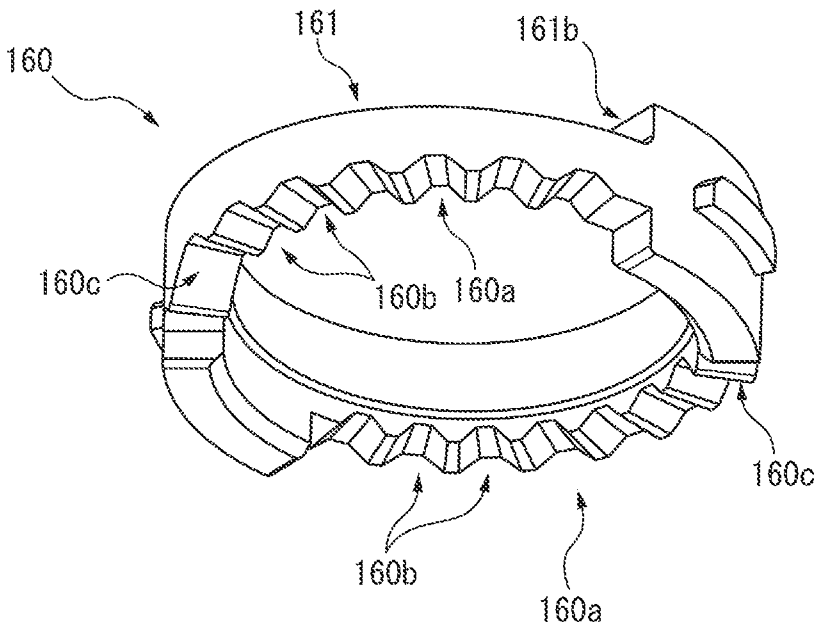
FIG. 18 is another perspective view of another rail cam member.

Referring to FIG. 16 to FIG. 18, another lead feed mechanism and feed adjustment mechanism will be explained. The lead feed mechanism receives the rotational drive force of the rotary part 40 of the rotation drive mechanism 30 and acts to feed the lead 7 to the front.

FIG. 16 is a perspective view of the dial cam member 150. The dial cam member 150 is arranged so that the upper side becomes the rear side of the mechanical pencil 1 in FIG. 16. The dial cam member 150 is a member formed into a cylindrical shape and has a grip 150*a* positioned at the center in the axial direction, a small diameter part 150*b* formed to a smaller diameter than the grip 150*a* at the rear of the grip 150*a*, a flange part 150*c* formed at the front of the small diameter part 150*b*, two fitting projections 150*d* formed at the rear end face of the flange part 150*c*, and a dial cam 151 formed at the rear end face of the small diameter part 150*b*. The two fitting projections 150*d* are arranged symmetrically about the center axis. The front of the grip 150*a* is formed in a small diameter. The two locking projections 150*e* extending to the front from the grip 150*a* are formed symmetrically about the center axis.

The dial cam 151 has a first slanted surface 151*a* such as a slope shape or spiral shape provided on the ring-shaped end face so as to rise along the circumferential direction and a first step part 151*b* provided in the axial direction between the start point (low position) and end point (high position) of the first slanted surface 151*a*. That is, the embodiment is configured so that the first step part 151*b* connects the start point and end point of the first slanted surface 151*a*.

FIG. 17 is a perspective view of a rail cam member 160, while FIG. 18 is another perspective view of the rail cam member 160. The rail cam member 160 is arranged so that its upper side becomes the rear side of the mechanical pencil 1 in FIG. 17. The rail cam member 160 is a member formed in a ring shape. The front end face of the rail cam member 160 is formed with two adjusting recesses 160*a* symmetric about a center axis. Each of the adjusting recesses 160*a* is comprised of six first fitting recesses 160*b* formed by recesses of the same depths arranged alongside each other in the circumferential direction at equal intervals and one second fitting recess 160*c* formed by a recess shallower than the first fitting recess 160*b*.

At the rear end face of the rail cam member 160, a rail cam 161 is formed. The rail cam 161 has a second slanted surface 161*a* formed by a ring-shaped cam face such as a slope shape or spiral shape provided on the ring-shaped end face so as to rise along the circumferential direction and a second step part 161*b* provided in the axial direction between the start point (low position) and end point (high position) of the second slanted surface 161*a*. That is, the embodiment is configured so that the second step part 161*b* connects the start point and end point of the second slanted surface 161*a*. The second slanted surface 161*a* of the rail cam 161 is steeper than the first slanted surface 151*a* of the dial cam 151. The height of the second step part 161*b* of the rail cam 161 is higher than the height of the first step part 151*b* of the dial cam 151.

Figure 19:
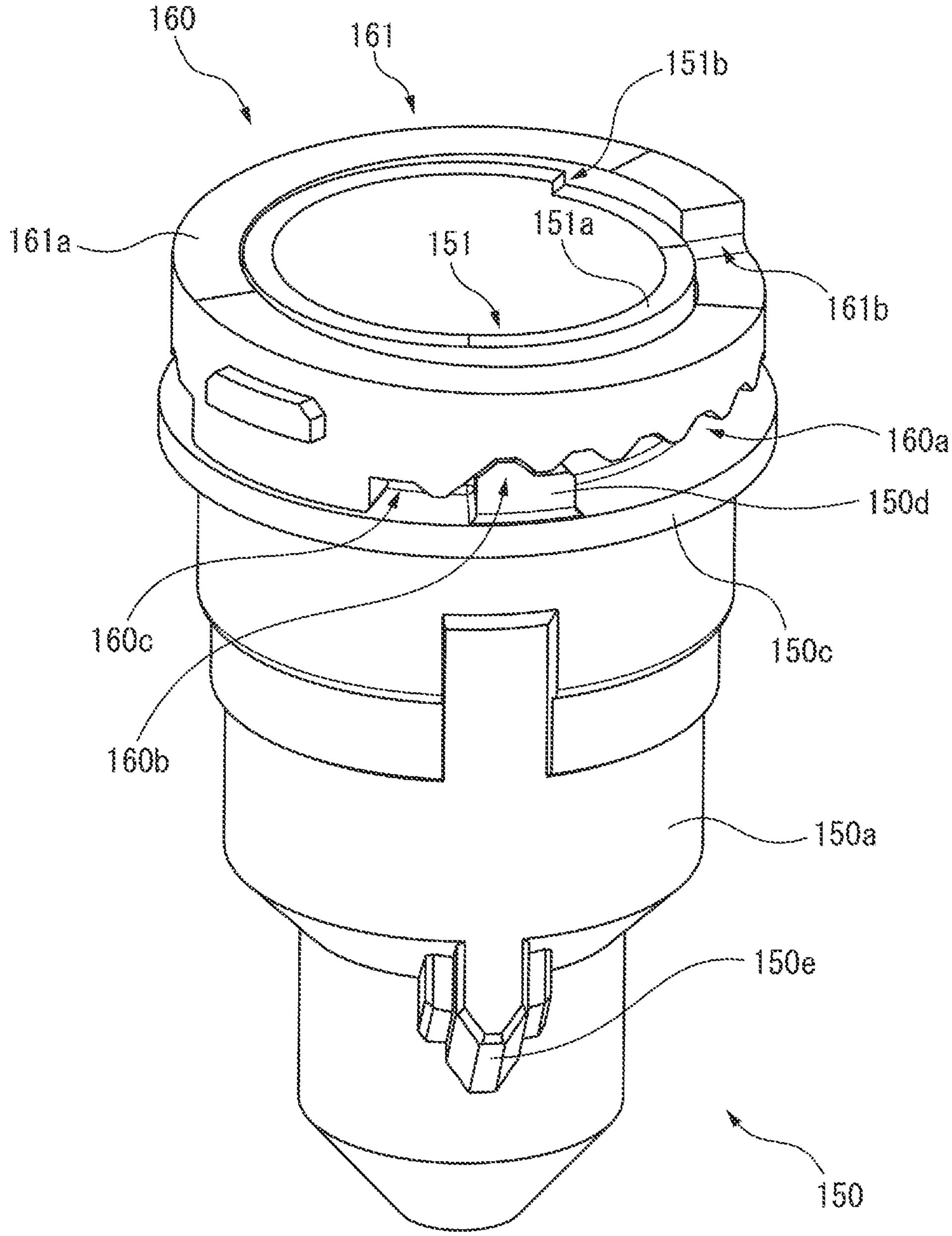
FIG. 19 is a perspective view of a combined dial cam member and rail cam member.
Figure 20:
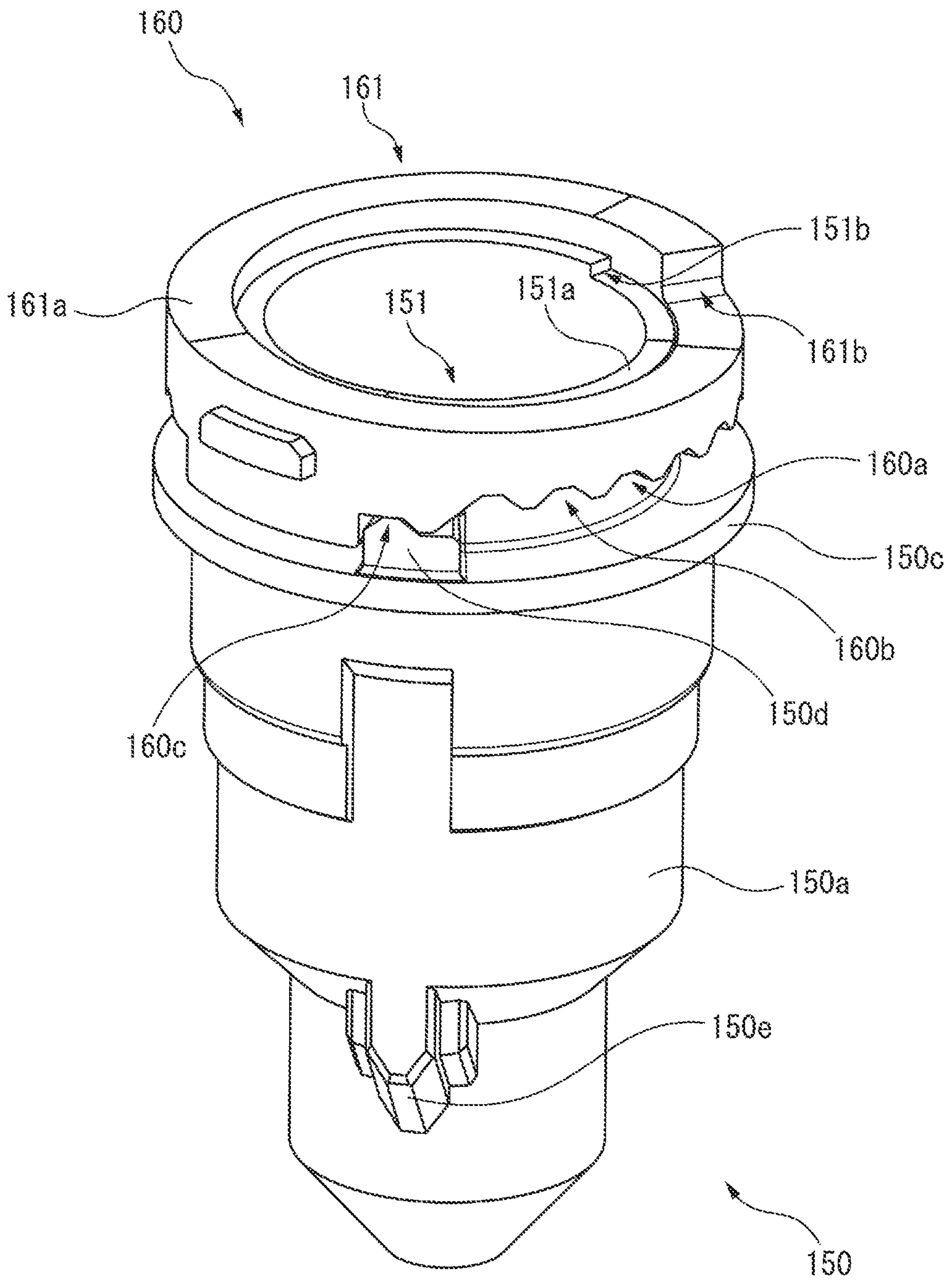
FIG. 20 is another perspective view of a combined dial cam member and rail cam member.

FIG. 19 is a perspective view of the dial cam member 150 and rail cam member 160 combined, while FIG. 20 is another perspective view of the dial cam member 150 and rail cam member 160 combined. The dial cam member 150 and rail cam member 160 are arranged so that the upper sides become the rear side of the mechanical pencil 1 in FIG. 19 and FIG. 20. The ring-shaped rail cam member 160 is inserted into the rear end part of the small diameter part 150*b* of the dial cam member 150 and is engaged by the flange part 150*c* to thereby be combined. That is, the front end face of the rail cam member 160 abuts against the rear end face of the flange part 150*c* of the dial cam member 150. More specifically, each of the fitting projections 150*d* provided at the flange part 150*c* of the dial cam member 150 fits into one of the first fitting recesses 160*b* or second fitting recess 160*c* of the adjusting recess 160*a* of the rail cam member 160. Accordingly, the rail cam member 160 is arranged at the outside of the dial cam member 150 in the diametrical direction. In FIG. 19, the fitting projection 150*d* fits into the first fitting recess 160*b* adjoining the second fitting recess 160*c*. Further, in FIG. 20, the fitting projection 150*d* fits into the second fitting recess 160*c*.

In the state where the dial cam member 150 and rail cam member 160 are combined, the dial cam 151 of the dial cam member 150 is arranged in the vicinity of the rail cam 161 of the rail cam member 160. Due to this, the dial cam 151 and rail cam 161 cooperate to form a continuous, that is, ring-shaped, feed cam face 70 in the circumferential direction.

As shown in FIG. 2. the dial cam member 150 and rail cam member 160 are arranged at the outside of the front end part 9*a* and the intermediate part 9*b* of the slider 9 in the combined state. Part of the dial cam member 150 and the rail cam member 160 are covered by the tip member 4 at their outer circumferential surfaces. A coil spring is arranged between the inner surface of the front end part of the tip member 4 and the flange part 150*c* of the dial cam member 150. Further, the cam abutting spring 18 biases the slider 9 to the front, so the abutting part 9*c* of the slider 9 maintains a state abutting against the feed cam face 70. The dial cam member 150 and rail cam member 160 are restricted in movement to the rear by the rear end face of the rail cam member 160, abutting against the front end face of the front shaft 2. Further, the outer circumferential surface of the rail cam member 160 engages with the inner circumferential surface of the tip member 4 Whereby rotation of the rail cam member 160 with respect to the tip member 4 and in turn the cylindrical barrel 6 is restricted.

The shape of the feed cam face 70 can be changed by making the dial cam member 150 and rail cam member 160 rotate relatively around the center axis. That is, a user grips the cylindrical barrel 6 with one hand and grips the grip 150*a* of the dial cam member 150 projecting out from the front end of the cylindrical barrel 6 with the other hand while making the dial cam member 150 rotate about the center axis with respect to the cylindrical barrel 6. The rail cam member 160 engages with the cylindrical barrel 6, so the dial cam member 150 rotates about the center axis with respect to the rail cam member 160.

The dial cam member 150 is rotated with respect to the rail cam member 160 in a stepped manner so that the fitting projections 150*d* of the dial cam member 150 move to and fit together with the first fitting recesses 160*h* or second fitting recesses 160*c* adjoining the corresponding rail cam member 160. Therefore, the dial cam member 150 is rotated with respect to the rail cam member 160 about its center axis in a stepped manner in the range of the adjusting recesses 160*a* of the rail cam member 160 in which the fitting projections 150*d* of the dial cam member 150 can move. The relative positions of the rail cam 161 of the rail cam member 160 and the dial cam 151 of the dial cam member 150 change in accordance with the positions of the first fitting recesses 160*b* or second fitting recesses 160*c* of the rail cam member 160 in which the fitting projections 150*d* of the dial cam member 150 fit. As a result, the shape of the feed cam face 70 can be changed. The dial cam member 150 is biased with respect to the rail cam member 160 by the coil spring. A click feeling is obtained at the time of the stepped-like rotation of the dial cam member 150 with respect to the rail cam member 160. The change of the shape of the feed cam face 70 will be further explained while referring to FIG. 21 and FIG. 22.

Figure 21:
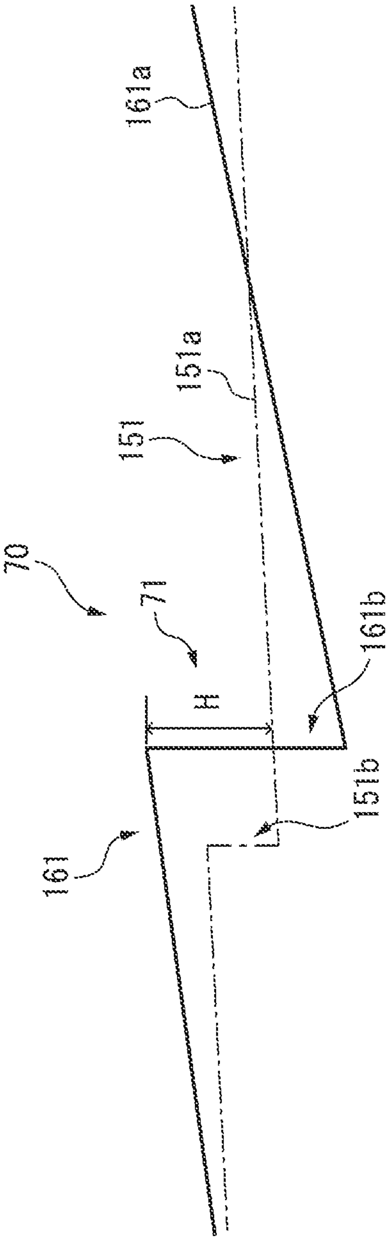
FIG. 21 is a schematic view showing the feed cam face in FIG. 19.
Figure 22:
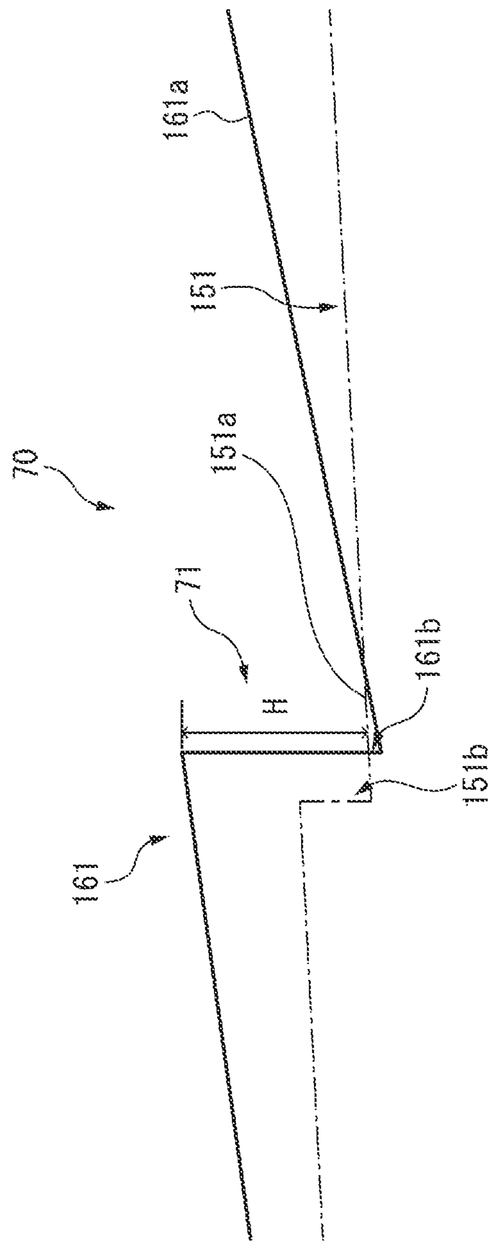
FIG. 22 is a schematic view showing the feed cam face in FIG. 20.

FIG. 21 is a schematic view showing the feed cam face 70 of FIG. 19, while FIG. 22 is a schematic view showing the feed cam face 70 of FIG. 20. FIG. 21 and FIG. 22 show the positional relationship of the dial cam member 150 and rail cam member 160 by laying out in the circumferential direction the cylindrical surface around the center axis including the feed cam face 70. In FIG. 21 and FIG. 22, the upper side is the rear side of the mechanical pencil 1.

Referring to FIG. 21, the dial cam member 150 is made to be positioned with respect to the rail cam member 160 so that the first slanted surface 151*a* of the dial cam 151 and the second slanted surface 161*a* of the rail cam 161 are superposed in the diametrical direction. In FIG. 21, the series of surfaces positioned further to the rear in the first slanted surface 151*a* of the dial cam 151 and the second slanted surface 161*a* of the rail cam 161, that is, the upper side in the figure, forms the feed cam face 70. That is, the first slanted surface 151*a* and the second slanted surface 161*a* cooperate to form the feed cam face 70. Note that, at the feed cam face 70, the height (height difference) of the step part 71 (drop difference) in the axial direction formed by the first slanted surface 151*a* of the dial cam 151 and the second step part 161*b* of the rail cam 161 is defined as the step height H.

Referring to FIG. 22, the dial cam member 150 is made to be positioned with respect to the rail cam member 160 so that, compared with the feed cam face 70 shown in FIG. 21, the second slanted surface 161*a* of the rail cam 161 is positioned more to the rear from the first slanted surface 151*a* of the dial cam 151. That is, in FIG. 22, as explained above, the fitting projections 150*d* fit with the second fitting recesses 160*c* formed by recesses shallower than the first fitting recesses 160*b*. Therefore, the rail cam 161 is arranged more to the rear from the dial cam 151. On the other hand, if the fitting projections 150*d* move between the six first fitting recesses 160*b* formed by recesses of the same depths, the rail cam 161 is at the same position in the axial direction with respect to the dial cam 151.

If focusing on the step height H, when the fitting projections 150*d* are fit with the first fitting recess 160*b* furthest from the second fitting recess 160*c* in the adjusting recesses 160*a*, the step height H is the smallest. If the fitting projections 150*d* are fit with the first fitting recess 160*b* closer to the second fitting recess 160*c*, the step height H becomes larger proportionally to the slant of the first slanted surface 151*a* of the dial cam 151. That is, when the fitting projections 150*d* move between adjoining first fitting recesses 160*b*, the amounts of change of the step height H are constant. When moving from the state shown in FIG. 19 where the fitting projections 150*d* fit with the first fitting recesses 160*b* adjoining the second fitting recesses 160*c* to the state shown in FIG. 20 where they are fit with the second fitting recesses 160*c*, the amount of change of the step height H becomes maximum.

The rotary part 40 of the rotation drive mechanism 30 gradually drives the slider 9 to rotate based on the cushion motion of the lead 7. That is, when viewing the front end part 9*a* of the slider 9 first, the slider 9 rotates to the right about the center axis. Due to this rotational movement, the abutting part 9*c* of the slider 9 moves in the circumferential direction while cooperating with the feed cam face 70. That is, the abutting part 9*c* of the slider 9 moves so as to rise along the first slanted surface 151*a* of the dial cam 151 or the second slanted surface 161*a* of the rail cam 161 forming the feed cam face 70. At this time, the slider 9 gradually retracts.

If the abutting part 9*c* reaches the step part 71, it is pushed by the biasing force of the cam abutting spring 18 and falls in the step part 71. That is, the slider 9 moves forward from the second slanted surface 161*a* of the rail cam 161 by exactly the amount of step part height H of the step part 71. At this time, the holding chuck 10 arranged at the inside of the slider 9 also similarly moves forward, so the lead 7 held at the holding chuck 10 is pulled out from the ball chuck 11 and is fed out relatively from the front end pipe 8 by exactly the step part height H. Therefore, the amount of the lead 7 fed out, that is, the amount of feed, is equal to the step part height H.

Due to the above motion, it is possible to feed out the lead 7 from the front end pipe 8 every time the abutting part 9*c* circles along the feed cam face 70. By repeating this motion, the lead 7 is worn down along with the writing motion while the lead 7 is successively fed out.

In short, the lead feed mechanism is configured so that when the abutting part 9*c* moves along the feed cam face 70 in accordance with rotation of the rotary part 40 and the abutting part 9*c* falls in the step part 71 of the feed cam face 70, the advance motion of the slider 9 causes the lead 7 held by the holding chuck 10 to be pulled out from the ball chuck 11. The lead feed mechanism can utilize the step part 71 of the feed cam face 70 to convert the rotational drive force of the rotary part 40 at the rotation drive mechanism 30 to a feed motion of the lead 7. The configuration for forming the height difference of the feed cam face 70 will be referred to overall as the "drop difference".

Further, the mechanical pencil 1 is configured to drive rotation of the lead 7 held by the ball chuck 11 upon receiving the rotational drive force of the rotary part 40 at the rotation drive mechanism 30. Therefore, it is possible to prevent uneven wear of the lead 7 along with the progress in writing and as a result it is possible to prevent the thickness of the drawn lines or the darkness of the drawn lines from greatly changing. In short, the rotation drive mechanism 30 has a rotary part 40 and drives rotation of the rotary part 40 in one direction upon receiving a retracting motion in the axial direction due to the writing pressure which the lead 7 clutched by the ball chuck 11 receives and the advancing motion in the axial direction due to release of the writing pressure.

Further, in the feed adjustment mechanism, as explained above, by just making the dial cam member 150 and rail cam member 160 rotate relatively about the center axis, it is possible to change the step height H of the step part 71 at the feed cam face 70. Accordingly, it is possible to more simply and accurately adjust the amount of feed of the lead 7 by the lead feed mechanism.

If making adjustments so that the extent of wear of the lead 7, which differs depending on the writing pressure, itself varying depending on the user, the hardness of the lead 7 used, etc., and the amount of feed of the lead 7 substantially match, it is possible to hold continuously constant the amount of projection of the lead 7 from the front end pipe 8 regardless of the writing motion. As a result, in the mechanical pencil 1, it is possible to continue writing for a long time by a single click operation. It is preferable to form the dial cam 151 so that the step part 71 having the step height H corresponding to a length exceeding the extent of wear of the lead 7 normally envisioned is formed. Due to this, it becomes possible to set the amount of feed of the lead 7 corresponding to the preferences of all users.

In particular, by the adjusting recesses 160*a* having the second fitting recesses 160*c* formed by recesses shallower than the first fitting recesses 160*b*, at predetermined relative rotational positions of the dial cam member 150 and rail cam member 160, compared with other rotational positions, the dial cam member 150 and rail cam member 160 can be made to separate in the axial direction. In other words, the embodiment is configured so that the dial cam member 150 has the fitting projections, the rail cam member 160 has a plurality of fitting recesses able to fit with the fitting projections, and single ones of the plurality of fitting recesses are configured so that at the above predetermined rotational positions, the dial cam member 150 and rail cam member 160 are made to separate in the axial direction. As a result, the step height H of the step part 71 enables adjustment not comparatively, but to a great degree and enables great increase of the amount of feed. For example, if writing by a stronger writing pressure, the amount of wear of the lead 7 becomes greater than with normal writing pressure. In such a case, by making the amount of feed increase greatly, it becomes possible to continue writing for a long time by a single click operation.

In the above-mentioned embodiment, the dial cam member 150 was a cylindrical member functioning as the first cam member, but it may also be a ring-shaped member. Further, the rail cam member 160 was a ring-shaped member functioning as the second cam member, but it may also be a cylindrical member. The first cam member may also be provided with the rail cam 161 and the second cam member may be provided with the dial cam 151. That is, the ring-shaped or cylindrical first cam member and the ring-shaped or cylindrical second cam member arranged at the outside of the first cam member in the diametrical direction may cooperate to form the feed cam face. Further, the step height of the step part may also be adjusted by making the first cam member and second cam member move relatively back and forth, that is, making them separate in the axial direction.

In this regard, in the mechanical pencil described in PTL 4, the abutting part is made to reliably abut against the cam face by the slider being biased by the spring to the front. For this reason, compared with a mechanical pencil not having a lead feed mechanism but provided with a rotation drive mechanism, a writing pressure higher by exactly the biasing force of the spring is considered necessary. Further, since the abutting part is pushed by the spring against the cam face, frictional resistance occurs when the slider is rotated by the rotation drive mechanism. For that reason, the rotation of the rotation drive mechanism is liable to be obstructed. Further, the cam face is formed so as to rise along the circumferential direction, so in addition to the frictional resistance, a force component in a direction against the biasing force of the spring also becomes a cause of obstructing the rotation of the rotation drive mechanism.

As opposed to this, in the mechanical pencil 1, the lead feed mechanism is configured so as not to obstruct rotation of the rotation drive mechanism 30. This will be explained in detail below.

In the mechanical pencil 1, as explained above, the rear end of the cam abutting spring 18 is attached to the flange part 12*a* of the relay member 12 while the front end of the cam abutting spring 18 is attached to the inside wall of the rear end part of the slider 9. Further, the relay member 12 coupled with the rotary part 40 transmits the rotational motion of the rotary part 40 at the rotation drive mechanism 30 to the ball chuck 11 in the state clutching the lead 7, but does not directly transmit it to the slider 9. That is, the slider 9 is arranged at the outside of the front end part of the relay member 12, but is not directly coupled with the relay member 12. Instead of this, the rotation drive force is transmitted from the rotary part 40 to the slider 9 at the rotation drive mechanism 30 through the cam abutting spring 18.

In detail, the cam abutting spring 18 biases the slider 9 to the front to function to make the abutting part 9*c* abut against the cam face and to function as a torsion spring. For this reason, at the time of rotation of the relay member 12 coupled with the rotary part 40, if there is no resistance or the resistance is small at the time of rotation of the slider 9 about its center axis, the slider 9 also rotates following the rotation of the relay member 12. On the other hand, at the time of rotation of the relay member 12 coupled with the rotary part 40, if the resistance is large at the time of rotation of the slider 9 about its center axis, the slider 9 does not rotate and the elastic energy in the torsional direction is stored in the cam abutting spring 18. Specifically, in the path T of FIG. 14, the region M right after the abutting part 9*c* moves to the rear in the step-like recess 63, that is, after rising over the second bottom surface 63*b*, the frictional force due to the frictional resistance between the abutting part 9*c* and the feed cam face 70 becomes maximum.

First, if releasing the writing pressure, the abutting part 9*c* abuts against the second bottom surface 63*b* at the point M1 due to the biasing force of the cam abutting spring 18. At this time, the rotation drive mechanism 30 is a state between FIG. 6C and FIG. 7D.

Next, the rotation drive mechanism 30 shifts to the state of FIG. 7E (or FIG. 6A) and the rotary part 40 rotates. At this time, the slider 9 moves to the rear by exactly the amount of the height from the second bottom surface 63*b*, so the cam abutting spring 18 is compressed by exactly the amount of the height of the second bottom surface 63*b*. If the cam abutting spring 18 is compressed, the abutting part 9*c* pushes against the second bottom surface 63*b* by a stronger force as the reaction force of the biasing force of the cam abutting spring 18. Accordingly, the frictional force between the abutting part 9*c* and the second bottom surface 63*b*, that is, the dynamic friction force and static friction force, increases. For this reason, even if the rotation drive mechanism 30 shifts to the state of FIG. 7E, the abutting part 9*c* does not move from the point M1. In other words, the slider 9 does not rotate and elastic energy in the torsion direction is stored in the cam abutting spring 18.

Next, if the next writing pressure is applied, the state shifts from the state of FIG. 6A to the state of FIG. 6B. At this time, the relay member 12 moves to the rear through the lead 7, so the cam abutting spring 18 coupled with the relay member 12 relatively extends and the biasing force of the cam abutting spring 18 pushing the abutting part 9*c* to the second bottom surface 63*b* is reduced. At that instant, the torque of the twist back due to the release of the elastic energy stored in the cam abutting spring 18 exceeds the maximum static friction force between the abutting part 9*c* and the second bottom surface 63*b* and makes the abutting part 9*c* rotate. As a result, the abutting part 9*c* slides over the region M of the second bottom surface 63*b* against the frictional force and reaches the point M2. Due to this, the phase of rotation of the slider 9 again matches the phase of rotation of the rotary part 40, and the abutting part 9*c* is returned to movement following the path T along the cam face of the rotation drive mechanism 30.

Here, consider the case of applying the behavior of the abutting part at the region M to the mechanical pencil described in PTL 4 and of the slider having the abutting part being directly coupled through the relay member. If releasing the writing pressure and the abutting part abuts against the second bottom surface at the point M1 due to the biasing force of the cam abutting spring, due to the increased dynamic friction force and static friction force, it is not possible to slide to the point M2. Accordingly, rotation of the rotation drive mechanism coupled with the slider is obstructed and the lead cannot be sufficiently made to rotate. Furthermore, in the mechanical pencil described in PTL 4, the cam face corresponding to the ring-shaped cam face 62 in the mechanical pencil 1 of the above-mentioned embodiment is a cam face rising along the circumferential direction. Accordingly, the abutting part compresses the cam butting spring while moving the cam face, so the dynamic friction force and static friction force between the abutting part and the cam face increase more and rotation of the rotation drive mechanism is obstructed more.

To reduce the dynamic friction force and static friction force between the abutting part and the cam face, it may be considered to use a coil spring with a smaller spring constant as the cam abutting spring and to reduce the biasing force of the cam abutting spring. However, if using a cam abutting spring with a small biasing force, rotation of the rotation drive mechanism is not obstructed, but in the lead feed mechanism, the force for feeding out the lead becomes weaker. As a result, lead is liable to be no longer fed out, so a coil spring with a certain extent of magnitude of spring constant is necessary.

On the other hand, in the mechanical pencil 1 of the above-mentioned embodiment, a coil spring having a spring constant by which a force for feeding out the lead 7 or a force of equal to or greater than that can be obtained can be used as the cam abutting spring 18. Therefore, in the mechanical pencil 1, despite being configured so as not to obstruct the rotation of the rotation drive mechanism 30, it is possible to realize a feed operation of the lead 7 with a highly reliable precision of operation. Further, the ring-shaped cam face 62 is formed vertical to the axial direction, so no force component is received in a direction against the biasing force of the cam abutting spring 18 and rotation of the rotation drive mechanism 30 is not obstructed by this.

In short, in the mechanical pencil described in PTL 4, the rotational drive force is transmitted from the rotary part to the slider through a rigid body, while in the mechanical pencil 1 of the above-mentioned embodiment, the rotational drive force is transmitted from the rotary part 40 to the slider 9 through a coil spring of the cam abutting spring 18, that is, an elastic member. Therefore, as explained above, at the time of increase of the dynamic friction force and static friction force, elastic energy is stored in the elastic member. After that, at the time of decrease of the dynamic friction force and static friction force, the elastic energy stored in the elastic member can be released. Due to this, it is possible to drive the slider 9 and abutting part 9*c* to rotate at a suitable timing without obstructing the rotational drive of the rotary part 40 of the rotation drive mechanism 30.

Note that, as the elastic member transmitting rotational drive force from the rotary part 40 to the slider 9, any configuration and material can be employed so long as able to store torsional direction elastic energy. Therefore, as the elastic member, in addition to a torsion spring, for example a tube-shaped elastomer may also be used.

REFERENCE SIGNS LIST

1 mechanical pencil
2 front shaft
3 rear shaft
4 tip member
5 inner tube
6 cylindrical barrel
7 lead
8 front end pipe
9 slider
9*c* abutting part
10 holding chuck
11 ball chuck
12 relay member
13 fastener
14 chuck body
15 chuck holder
16 ball
17 coil spring
18 cam abutting spring
19 lead case
20 click rod
21 coil spring
22 eraser
23 click cover
30 rotation drive mechanism
31 shaft spring
40 rotary part
40*a* first cam face
40*b* second cam face
41 upper cam forming member
41*a* first fixed cam face
42 lower cam forming member
42*a* second fixed cam face
43 cylinder member
44 torque canceller
45 cushion spring
50 dial cam member
50*a* grip
50*b* small diameter part
50*c* flange part
50*d* fitting projection
51 dial cam
51*a* first cam bottom surface
51*b* second cam bottom surface
51*c* third cam bottom surface
51*d* rear end cam face
60 rail cam member
60*a* adjusting recess
60*b* fitting recess
60*c* peripheral wall
61 rail cam
62 ring-shaped cam face
63 recess
63*a* first bottom surface
63*b* second bottom surface
70 feed cam face
71 step part (drop difference)
80 O-ring

The invention claimed is:

1. A mechanical pencil which comprises a ball chuck allowing advance of the lead and preventing retraction, a rotation drive mechanism having a rotary part and receiving an axial direction retraction operation due to writing pressure received by the lead held by the ball chuck and an axial direction advance operation due to release of the writing pressure to drive the rotary part to rotate in one direction, a feed cam face having a ring-shaped cam face vertical to the axial direction and an axial direction drop difference provided at the ring-shaped cam face, and a slider having an abutting part abutting against the feed cam face and a holding chuck holding a lead and rotating upon receiving a rotation drive force of the rotary part, which is configured so that the lead held by the holding chuck is pulled out from the ball chuck due to the advance operation of the slider when the abutting part moves along the feed cam face according to rotation of the rotary part and the abutting part falls into the drop difference, wherein the mechanical pencil is configured so as to adjust the height of the drop difference to adjust the amount of feed of the lead, and wherein the mechanical pencil further comprises a ring-shaped or cylindrical first cam member and a ring-shaped or cylindrical second cam member arranged at the outside of the first cam member in the diametrical direction, the first cam member and the second cam member cooperating to configure the feed cam face.

2. The mechanical pencil according to claim 1, wherein one of the first cam member and the second cam member is formed with a recess, the other of the first cam member and the second cam member is formed with a cam forming part, and the recess and the cam forming part cooperate to configure the feed cam face.

3. The mechanical pencil according to claim 2, wherein the cam forming part is formed into a stepped shape or a slope shape.

4. The mechanical pencil according to claim 1, wherein the first cam member and second cam member are made to relatively rotate about a center axis to thereby adjust the height of the drop difference.

5. The mechanical pencil according to claim 1, wherein the first cam member and the second cam member are made to move back and forth relatively to adjust the height of the drop difference.

6. A mechanical pencil which comprises a ball chuck allowing advance of the lead and preventing retraction, a rotation drive mechanism having a rotary part and receiving an axial direction retraction operation due to writing pressure received by the lead held by the ball chuck and an axial direction advance operation due to release of the writing pressure to drive the rotary part to rotate in one direction, a feed cam face having a ring-shaped cam face and an axial direction drop difference provided at the ring-shaped cam face, a slider having an abutting part abutting against the feed cam face and a holding chuck holding a lead and rotating upon receiving a rotation drive force of the rotary part, a ring-shaped or cylindrical first cam member, and a ring-shaped or cylindrical second cam member arranged outside from the first cam member in the diametrical direction, the first cam member and the second cam member cooperating to form the feed cam face, and which is configured so that the lead held by the holding chuck is pulled out from the ball chuck due to the advance operation of the slider when the abutting part moves along the feed cam face according to rotation of the rotary part and the abutting part falls into the drop difference, wherein the first cam member is formed with a first slanted surface, the second cam member is formed with a second slanted surface, and the first slanted surface and the second slanted surface cooperate to configure the feed cam face.

7. The mechanical pencil according to claim 6, which is configured so as to adjust the height of the drop difference to adjust the amount of feed of the lead.

8. The mechanical pencil according to claim 6, wherein the first cam member and second cam member are made to relatively rotate about a center axis to thereby adjust the height of the drop difference.

9. The mechanical pencil according to claim 8, wherein the first cam member and the second cam member are separated in the axial direction more at a relative predetermined rotational position of the first cam member and the second cam member compared with other rotational positions.

10. The mechanical pencil according to claim 9, wherein the first cam member has a fitting projection, the second cam member has a plurality of fitting recesses able to fit with the fitting projection, and one of the plurality of fitting recesses is configured to make the first cam member and the second cam member separate in the axial direction at the predetermined rotational position.

11. The mechanical pencil according to claim 6, wherein the first cam member and second cam member are made to move back and forth relatively to adjust the height of the drop difference.

12. The mechanical pencil according to claim 1, wherein the ball chuck is configured to rotate upon receiving the rotational drive force of the rotary part and thereby make the lead rotate.

13. The mechanical pencil according to claim 6, wherein the ball chuck is configured to rotate upon receiving the rotational drive force of the rotary part and thereby make the lead rotate.

* * * * *